United States Patent
Okamoto

(10) Patent No.: US 9,767,397 B2
(45) Date of Patent: Sep. 19, 2017

(54) COLOR SEPARATION CONDITION DETERMINING APPARATUS, METHOD AND NON-TRANSITORY STORAGE MEDIUM

(71) Applicant: FUJIFILM Corporation, Tokyo (JP)

(72) Inventor: Takahiro Okamoto, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/151,936

(22) Filed: Jan. 10, 2014

(65) Prior Publication Data
US 2014/0125998 A1 May 8, 2014

Related U.S. Application Data

(63) Continuation of application No. PCT/JP2012/062893, filed on May 21, 2012.

(30) Foreign Application Priority Data

Jul. 12, 2011 (JP) .................. 2011-153403

(51) Int. Cl.
G06K 15/02 (2006.01)
H04N 1/60 (2006.01)

(52) U.S. Cl.
CPC ....... G06K 15/1878 (2013.01); H04N 1/6016 (2013.01); H04N 1/6072 (2013.01)

(58) Field of Classification Search
CPC ................... H04N 1/6016; G06K 15/1878
See application file for complete search history.

(56) References Cited

U.S. PATENT DOCUMENTS

| 2003/0169438 A1 | 9/2003 | Velde et al. |
| 2005/0254073 A1 | 11/2005 | Braun et al. |
| 2006/0072127 A1 | 4/2006 | Herron |
| 2007/0242294 A1 | 10/2007 | Fujiwara |

(Continued)

FOREIGN PATENT DOCUMENTS

| EP | 0 310 829 A2 | 4/1989 |
| JP | 08-065514 A | 3/1996 |
| JP | 4197346 B2 | 12/2008 |

OTHER PUBLICATIONS

International Search Report for PCT/JP2012/062893 dated Jun. 19, 2012.

(Continued)

*Primary Examiner* — Mohammad Ghayour
*Assistant Examiner* — Lennin Rodriguezgonzale
(74) *Attorney, Agent, or Firm* — Birch, Stewart, Kolasch & Birch, LLP

(57) ABSTRACT

The present invention relates to a color separation condition determination device, method and storage medium. A pixel of interest is extracted from multiple pixels, and the influence of visual effect applied to the pixel of interest is estimated on the basis of the positional relationship between the color of the pixel of interest and each color of at least one surrounding pixel. Also, the total usage of color materials in the pixel of interest is estimated. The color separation condition in the pixel of interest is determined on the basis of the respectively estimated influence of visual effect and total usage of color materials.

13 Claims, 17 Drawing Sheets

(56) References Cited

U.S. PATENT DOCUMENTS

2008/0246982 A1* 10/2008 Kaneko .................... H04N 1/54
                                                                         358/1.9
2009/0096825 A1*  4/2009 Takahashi .............. B41J 2/2132
                                                                         347/12

OTHER PUBLICATIONS

European Search Report dated Nov. 26, 2014, corresponding European Patent Application No. 12811681.1.

* cited by examiner

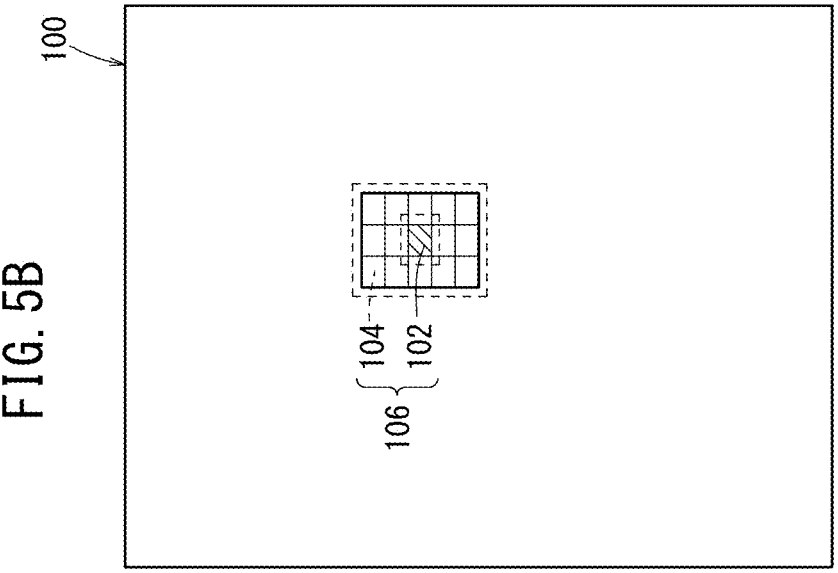

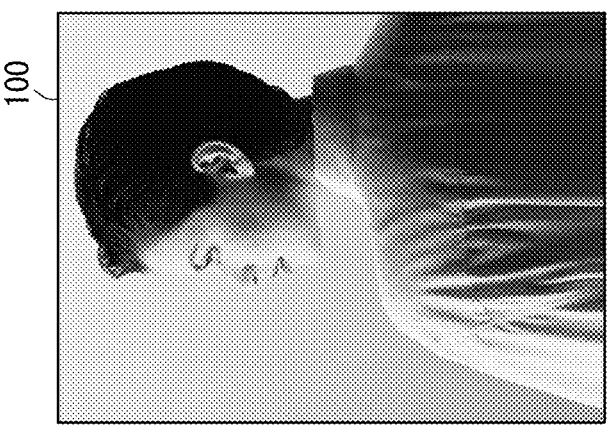
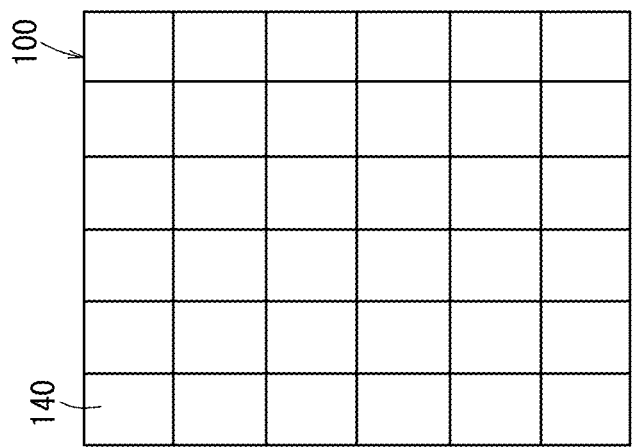
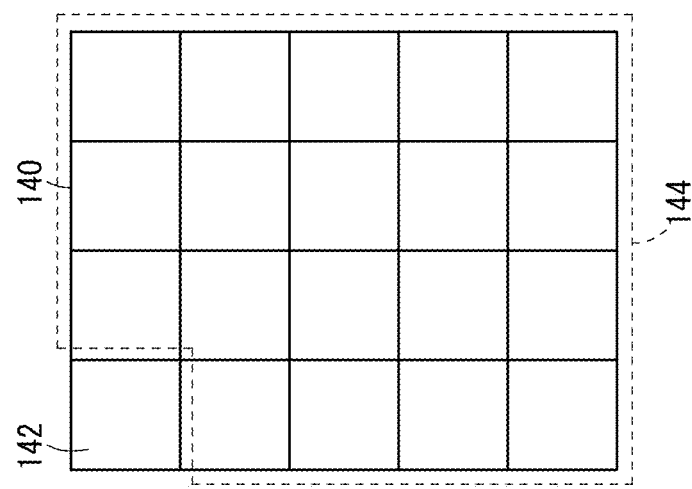

1

COLOR SEPARATION CONDITION DETERMINING APPARATUS, METHOD AND NON-TRANSITORY STORAGE MEDIUM

CROSS-REFERENCE TO RELATED APPLICATIONS AND PRIORITY CLAIM

This application is a Continuation of International Application No. PCT/JP2012/062893 filed on May 21, 2012, which was published under PCT Article 21(2) in Japanese, which is based upon and claims the benefit of priority from Japanese Patent Application No. 2011-153403 filed on Jul. 12, 2011, the contents all of which are incorporated herein by reference.

TECHNICAL FIELD

The present invention relates to a color separation condition determining apparatus, a color separation condition determining method, and a non-transitory storage medium which, in order to produce an output image from an image forming apparatus using n color materials (where n is an integer of 2 or greater), determine a color separation condition to convert first color signals representing a plurality of pixels in m color channels (where m is an integer of 1 or greater) into second color signals representing a plurality of pixels in n color channels, which are associated respectively with used amounts of the color materials.

BACKGROUND ART

With significant advances in inkjet technology in recent years, it is becoming possible for inkjet image forming devices to produce large color prints of high quality at high speeds. Inkjet image forming devices are capable of producing prints by forming a number of ink dots on a recording medium by ejecting droplets of a plurality of inks, e.g., C, M, Y, K inks, onto the recording medium. Inkjet image forming devices are used widely, particularly in sign and display applications, and are applicable to, for example, prints on POP (Point Of Purchase) posters, wall posters, outdoor advertisements, billboards, etc. There are a wide variety of content types to be presented as prints, which include not only text, but also natural images, illustrations, graphs, computer graphics, etc. Various image processing technologies have been proposed in the art for identifying a content type from local features represented by an input image signal, and performing a color conversion process suitable for the identified content type.

Japanese Patent No. 4197346 discloses an apparatus for and a method of identifying character/halftone areas (or base/print sheet areas) from a relationship between densities in blocks, each of which is made up of a plurality of pixels, and selecting LUTs (Look Up Tables) suitable for the identified areas.

Japanese Laid-Open Patent Publication No. 08-065514 reveals an apparatus for and a method of separating and identifying character areas, photo areas, and halftone areas from input image data, and changing, in a stepwise and continuous manner, gradation characteristics that are suitable for the separated and identified areas.

SUMMARY OF INVENTION

Even if respective content items are of the same type, such content items may have different color distributions and spatial frequency distributions, depending on the images represented by the content items. According to the apparatus and methods disclosed in Japanese Patent No. 4197346 and Japanese Laid-Open Patent Publication No. 08-065514, a uniform color conversion process is performed on each of the identified areas. However, there is room for further optimization.

The present invention has been made to solve the aforementioned problems. It is an object of the present invention to provide a color separation condition determining apparatus, a color separation condition determining method, and a non-transitory storage medium, which are capable of producing prints in which an image is optimized for each local area.

According to the present invention, there is provided a color separation condition determining apparatus which, in order to produce an output image by an image forming apparatus using n color materials (where n is an integer of 2 or greater), determines a color separation condition to convert first color signals representing a plurality of pixels in m color channels (where m is an integer of 1 or greater) into second color signals representing a plurality of pixels in n color channels that are correlated respectively with used amounts of the color materials. The color separation condition determining apparatus comprises a pixel-of-interest extractor for extracting a pixel of interest from the plurality of pixels, an affecting level estimator for estimating the affecting level of a visual effect on the pixel of interest in a layout of the color of the pixel of interest, which is extracted by the pixel-of-interest extractor, and the color of at least one of peripheral pixels disposed around the pixel of interest, a used-amount-of-color-material estimator for estimating the total used amount of the n color materials in the pixel of interest, and a color separation condition determiner for determining the color separation condition for the pixel of interest based on the affecting level of the visual effect, which is estimated by the affecting level estimator, and the total used amount of the n color materials, which is estimated by the used-amount-of-color-material estimator.

Since the affecting level estimator estimates the affecting level of a visual effect on the pixel of interest in a layout of the color of the pixel of interest, which is extracted, and the color of at least one of the peripheral pixels surrounding the pixel of interest, characteristics at a macroscopic level of the image including the peripheral pixels can be grasped. Furthermore, since the used-amount-of-color-material estimator estimates the total used amount of the n inks in the pixel of interest, characteristics at a microscopic level of the image of the pixel of interest can be grasped. Stated otherwise, a color separation condition can be determined based on image characteristics at both a macroscopic level and a microscopic level, whereby a print having an optimized image in each local area can be produced.

Preferably, the affecting level of the visual effect includes at least one of a spatial frequency response characteristic, a color resolution, a lightness contrast effect, a saturation contrast effect, a hue contrast effect, and a complementary color contrast effect in human vision.

Preferably, the color separation condition determiner determines the color separation condition such that the color of the pixel of interest based on the first color signals coincides substantially with the color of the pixel of interest based on the second color signals in a device-independent color space.

Preferably, the affecting level estimator estimates the affecting level of the visual effect using a different number of the peripheral pixels, wherein the different number depends on the output resolution of the image forming apparatus.

Preferably, the color separation condition determiner includes a suitability judging section for judging whether or not a comparative color separation condition is suitable, by comparing a standard affecting level under a standard color separation condition and a comparative affecting level under the comparative color separation condition, the standard affecting level and the comparative affecting level being affecting levels of the visual effect, which are estimated by the affecting level estimator based on output characteristics of the image forming apparatus and the first color signals.

Preferably, the color separation condition determining apparatus further comprises a color separation condition changer for changing the comparative color separation condition, which is supplied to the affecting level estimator, depending on the judgment made by the suitability judging section.

Preferably, the color separation condition determiner further includes a matching condition setter for setting a matching condition for the color separation condition. Changing of the comparative color separation condition by the color separation condition changer, estimating of the affecting level of the visual effect by the affecting level estimator, and judging of whether or not the comparative color separation condition is suitable by the suitability judging section are successively repeated in order to determine the color separation condition according to the matching condition set by the matching condition setter.

Preferably, the affecting level estimator estimates the affecting level of the visual effect using a granularity, which is dependent on human visual response characteristics.

Preferably, the affecting level estimator comprises a simulation image generator for generating a simulation image, which simulates the color reproduction of the output image based on the output characteristics of the image forming apparatus, and a granularity calculator for calculating the granularity based on the simulation image generated by the simulation image generator.

Preferably, the simulation image generator generates the simulation image at a resolution that is higher than the resolution of the first color signals.

Preferably, the granularity calculator predicts colorimetric values of the output image for each pixel of the simulation image, and estimates the granularity based on the colorimetric values.

Preferably, the affecting level estimator estimates the affecting level of the visual effect using at least one image evaluation value with respect to the output image and the granularity.

Preferably, the at least one image evaluation value includes the total used amount of the n color materials.

Preferably, the at least one image evaluation value includes an evaluation value representing a quantified visibility of jaggies.

According to the present invention, there also is provided a color separation condition determining method which, in order to produce an output image by an image forming apparatus using n color materials (where n is an integer of 2 or greater), determines a color separation condition to convert first color signals representing a plurality of pixels in m color channels (where m is an integer of 1 or greater) into second color signals representing a plurality of pixels in n color channels that are correlated respectively with used amounts of the color materials, the color separation condition determining method comprising the steps of extracting a pixel of interest from the plurality of pixels, estimating the affecting level of a visual effect on the pixel of interest in a layout of the color of the pixel of interest, which is extracted, and the color of at least one of peripheral pixels disposed around the pixel of interest, estimating the total used amount of the n color materials in the pixel of interest, and determining a color separation condition for the pixel of interest based on the affecting level of the visual effect, which is estimated, and the total used amount of the n color materials, which is estimated.

According to the present invention, there is further provided a non-transitory storage medium readable by a computer that stores a program which, in order to produce an output image by an image forming apparatus using n color materials (where n is an integer of 2 or greater), determines a color separation condition to convert first color signals representing a plurality of pixels in m color channels (where m is an integer of 1 or greater) into second color signals representing a plurality of pixels in n color channels that are correlated respectively with used amounts of the color materials, the program enabling the computer to function as a pixel-of-interest extractor for extracting a pixel of interest from the plurality of pixels, an affecting level estimator for estimating the affecting level of a visual effect on the pixel of interest in a layout of the color of the pixel of interest, which is extracted by the pixel-of-interest extractor, and the color of at least one of peripheral pixels disposed around the pixel of interest, a used-amount-of-color-material estimator for estimating the total used amount of the n color materials in the pixel of interest, and a color separation condition determiner for determining a color separation condition for the pixel of interest based on the affecting level of the visual effect, which is estimated by the affecting level estimator, and the total used amount of the n color materials, which is estimated by the used-amount-of-color-material estimator.

With the color separation condition determining apparatus, the color separation condition determining method, and the non-transitory storage medium according to the present invention, since the affecting level of a visual effect on the pixel of interest is estimated in a layout of the color of the pixel of interest, which is extracted, and the color of at least one of the peripheral pixels surrounding the pixel of interest, characteristics at a macroscopic level of the image including the peripheral pixels can be grasped. Furthermore, since the total used amount of the n inks is estimated in the pixel of interest, characteristics at a microscopic level of the image of the pixel of interest can be grasped. Stated otherwise, a color separation condition can be determined based on image characteristics at both a macroscopic level and a microscopic level, whereby a print having an optimized image in each local area can be produced.

The aforementioned objects and other objects, characteristics, and advantages of the present invention will become more apparent from the following descriptions of preferred embodiments, taken in conjunction with the accompanying drawings.

BRIEF DESCRIPTION OF DRAWINGS

FIG. 5A is a diagram showing a visual image, which is represented by first color signals;

FIG. 5B is a diagram showing a pixel of interest, which is extracted by a pixel-of-interest extractor shown in FIG. 3;

FIG. 14A is a diagram showing a visual image, which is represented by first color signals;

FIG. 14B is a diagram showing a divided image area;

FIG. 14C is a diagram showing the makeup of a given divided area;

DESCRIPTION OF EMBODIMENTS

A color separation condition determining method according to a preferred embodiment of the present invention, in relation to a color separation condition determining apparatus and an image forming system for performing the color separation condition determining method, will be described in detail below with reference to the accompanying drawings. In the following description, the concept of forming an image may be referred to as "printing".

Figure 1:
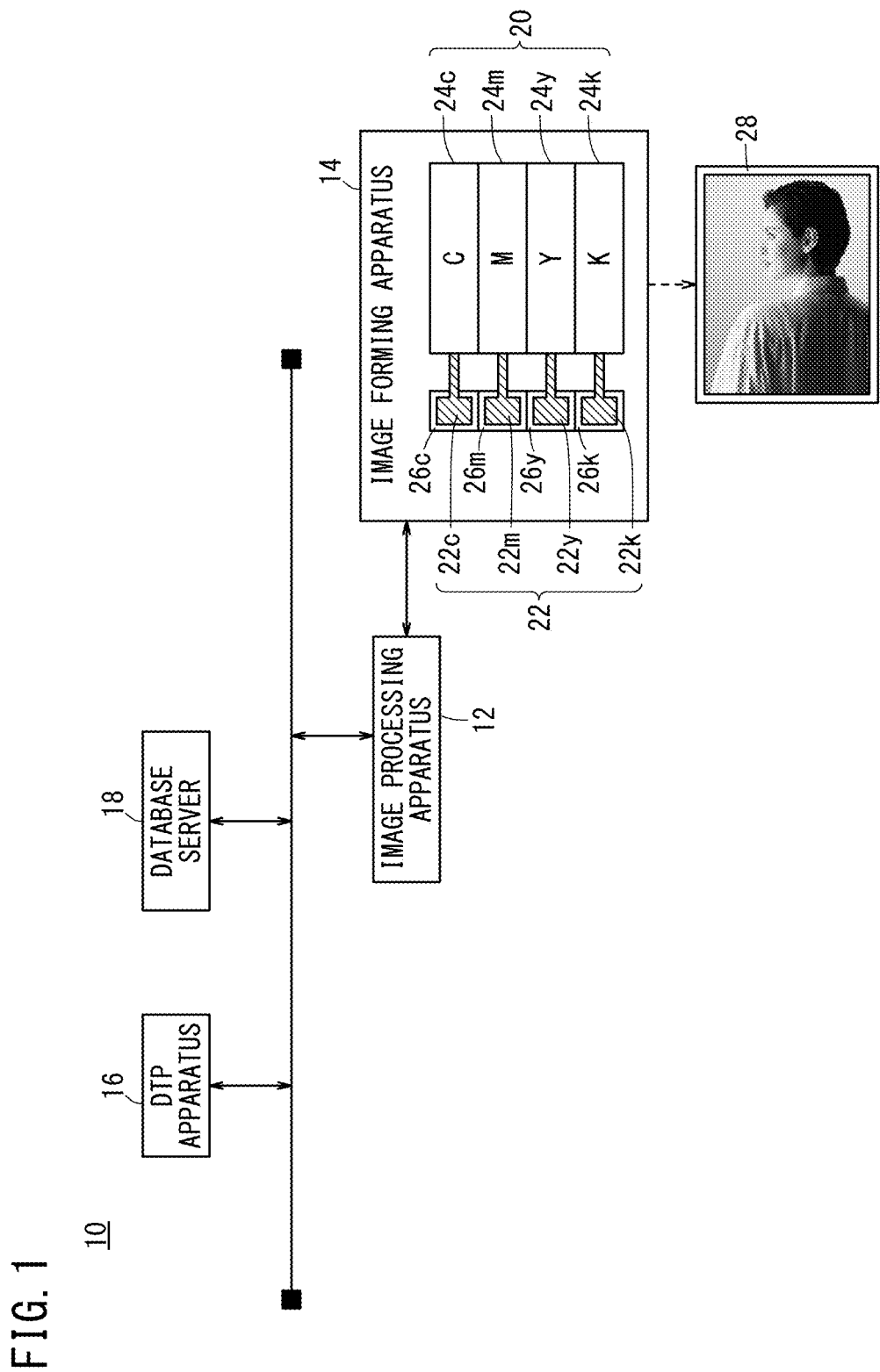
FIG. 1 is a block diagram of an image forming system incorporating therein an image processing apparatus as a color separation condition determining apparatus according to an embodiment of the present invention.

FIG. 1 shows in block form a printing system 10 (image forming system), which incorporates therein an image processing apparatus 12 as a color separation condition determining apparatus according to an embodiment of the present invention. As shown in FIG. 1, the printing system 10 basically includes the image processing apparatus 12, an image forming apparatus 14, a DTP (DeskTop Publishing) apparatus 16, and a database server 18. The image processing apparatus 12, the DTP apparatus 16, and the database server 18 are connected electrically to each other via a wired or wireless link.

The image processing apparatus 12 is a computer that converts input image data (device color signals or page description data) supplied from an external apparatus into device color signals suitable for use in the image forming apparatus 14, which produces a print based on the device color signals. The image processing apparatus 12 outputs the converted device color signals to the image forming apparatus 14. The device color signals represent image data defined as device-dependent data, e.g., raster-format data, such as TIFF data, bitmap data, RAW data, or the like, having color channels in four colors of C, M, Y, K or three colors of R, G, B. The device-dependent data supplied to the image forming apparatus 14 may have a unique data format with a desired header added thereto.

The image forming apparatus 14 is connected electrically to the image processing apparatus 12 through a serial interface such as a USB (Universal Serial Bus) cable, an IEEE1394 cable, an Ethernet (registered trademark) cable, a wireless network, or the like, or a parallel interface such as a Centronics cable.

The image forming apparatus 14 is an inkjet printer for forming an image on a medium (recording medium), not shown, by discharging ink droplets from a recording head assembly 20 while the medium is fed in a predetermined direction. The medium has a base, which may comprise a paper medium such as synthetic paper, thick paper, aluminum-evaporated paper, or the like, a resin medium such as vinyl chloride, PET, or the like, or tarpaulin paper, or the like.

The recording head assembly 20 comprises four line heads $24c$, $24m$, $24y$, $24k$ for discharging droplets made up of four color materials, i.e., C ink $22c$ (chromatic color material), M ink $22m$ (chromatic color material), Y ink $22y$ (chromatic color material), and K ink $22k$ (achromatic color material), having different colors. The C ink $22c$, the M ink $22m$, the Y ink $22y$, and the K ink $22k$ may hereinafter be collectively referred to as "inks 22".

Each of the line heads $24c$, $24m$, $24y$, $24k$ has a plurality of nozzles, not shown, arrayed along a widthwise direction of the medium. The C ink $22c$, the M ink $22m$, the Y ink $22y$, and the K ink $22k$ are stored in respective ink tanks $26c$, $26m$, $26y$, $26k$. The line head $24c$ discharges the C ink $22c$ supplied from the ink tank $26c$ through the nozzles thereof. The line head $24m$ discharges the M ink $22m$ supplied from the ink tank $26m$ through the nozzles thereof. The line head $24y$ discharges the Y ink $22y$ supplied from the ink tank $26y$ through the nozzles thereof. The line head $24k$ discharges the K ink $22k$ supplied from the ink tank $26k$ through the nozzles thereof.

The recording head assembly 20 may have an ink droplet propelling mechanism of any of various different types. For example, the recording head assembly 20 may have an actuator in the form of a piezoelectric device that serves as an ink droplet propelling mechanism, which propels and ejects droplets of inks 22 by mechanical deformation of the piezoelectric device based on a control signal. Alternatively, the recording head assembly 20 may have a thermal jet mechanism that serves as an ink droplet propelling mechanism, which propels and ejects droplets of inks 22 under the pressure of air bubbles that are generated by heating the inks 22 with a heater. The recording head assembly 20 is not limited to a line head assembly, but may be a multipass head assembly for reciprocally scanning the medium transversely thereacross in order to form an image thereon.

The image forming apparatus 14 generates control signals for controlling the line heads 24c, 24m, 24y, 24k to discharge inks. For generating the control signals, the image forming apparatus 14 can perform various image processing techniques, including a color separation process, a resolution converting process, a halftoning process, etc. The color separation process used herein refers to a process of converting first color signals representing m color plates (where m is an integer in the range of m≥1) into second color signals representing n color plates (where n is an integer in the range of n≥2). At least one of the first color signals and the second color signals may be color signals defined as device-dependent data or color signals defined as device-independent data. Colors belonging to one type but having different densities, such as C (cyan) and LC (light cyan), may be distinguished as different color plates.

In the color separation process, the image forming apparatus 14 converts first color signals supplied from the image processing apparatus 12 into second color signals that are used to form an output image (print 28). According to the present invention, from the standpoint of the amount of data required to be processed and the processing time, it is preferable for at least one of the inequalities m≥2 and m<n to be satisfied. For example, the first color signals may be R, G, B color signals (m=3) and the second color signals may be C, M, Y, K color signals (n=4).

The second color signals are correlated with respective used amounts of inks 22 in the image forming apparatus 14. The second color signals may be correlated with the respective used amounts of inks 22 as desired in the respective color channels. For example, the 0% used amounts of inks may be assigned to a lowest gradation level, the 100% used amounts of inks may be assigned to a highest gradation level, and the remaining used amounts of inks may be linearly assigned to intermediate gradation levels.

The DTP apparatus 16 is capable of editing material data made up of characters, figures, pictures, photos, etc. The DTP apparatus 16 generates electronic manuscripts in a page description language (hereinafter referred to as "PDL") by laying material data on each page. PDL refers to a language which is descriptive of image information including format information, positional information, color information (including density information), etc., of characters, figures, etc., in a "page" that serves as an output unit for printing, displaying, or the like. The DTP apparatus 16 performs a rasterizing process on electronic manuscripts represented in PDL format data. The rasterizing process includes a data format conversion process for converting PDL format data into a raster format, and a color converting process using an ICC (International Color Consortium) profile.

The database server 18 is an apparatus for registering and managing data such as job tickets of electronic manuscripts, e.g., JDF (Job Definition Format) files, color sample data, target profiles, or print profiles suitable for the combination of the image forming apparatus 14 and the medium.

Figure 2:
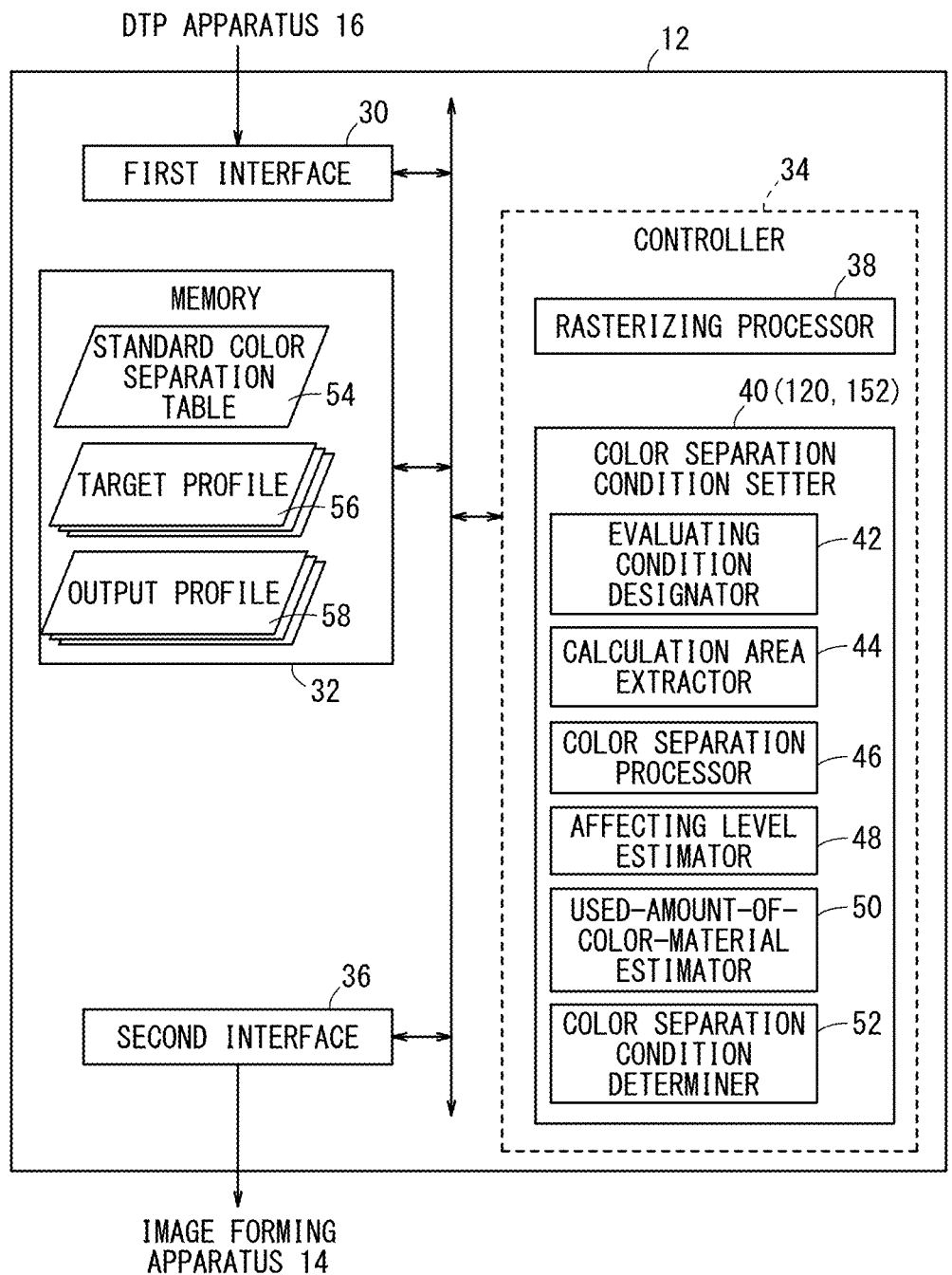
FIG. 2 is an electric block diagram of the image processing apparatus shown in FIG. 1.
Figure 3:
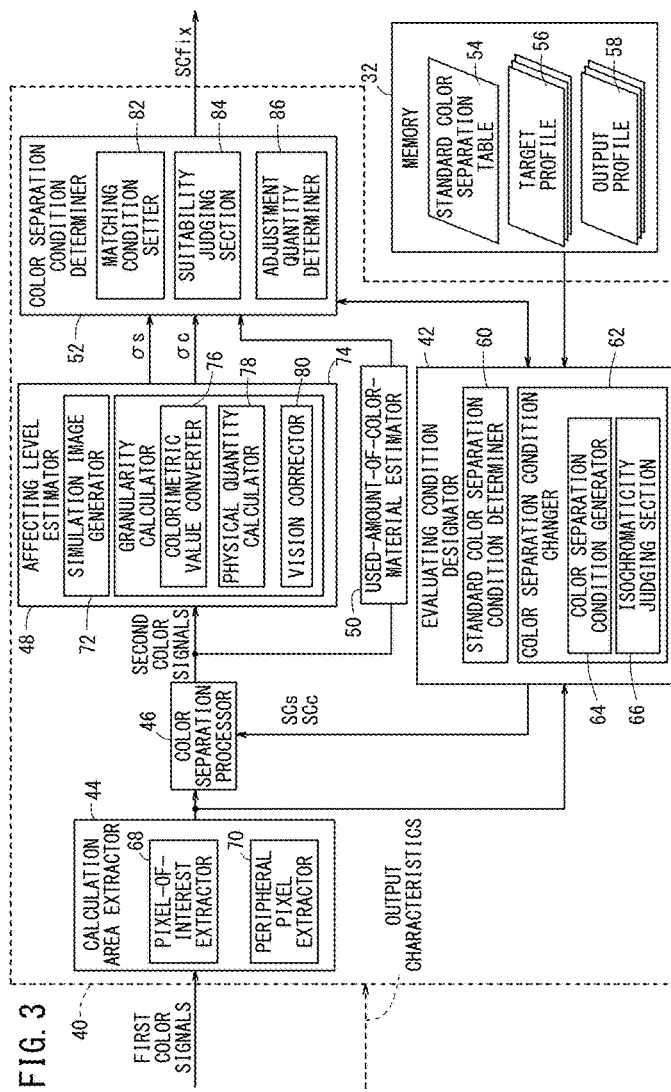
FIG. 3 is a detailed functional block diagram of a color separation condition setter shown in FIG. 2.

FIG. 2 is an electric block diagram of the image processing apparatus 12 shown in FIG. 1. FIG. 3 is a detailed functional block diagram of a color separation condition setter 40 shown in FIG. 2.

The image processing apparatus 12 includes a first interface 30 (color signal input unit), a memory 32 (non-transitory storage medium), a controller 34, and a second interface 36. The memory 32, which is readable by a computer, stores programs for controlling the controller 34 to function as a color separation condition determining apparatus according to the present embodiment.

The first interface 30 receives electric signals from one or more external apparatus. For example, the first interface 30 acquires device color signals and PDL data, which are edited and generated by the DTP apparatus 16, and also acquires various items of information such as ICC profiles or the like, which are registered and managed in the database server 18.

The second interface 36 sends electric signals to one or more external apparatus. For example, the second interface 36 supplies the image forming apparatus 14 with various items of information concerning color separation conditions (hereinafter referred to as "color separation condition information"), which have been determined by the color separation condition determining method according to the present invention.

The color separation condition information includes the types and number of color plates represented by input and output color signals, color separation tables (conversion LUTs), coefficients of conversion matrices, forms and coefficients of conversion formulas, variables of learning models, etc. A color separation process that uses color separation tables according to the present embodiment will be described below.

The controller 34, which comprises an information processor such as a CPU or the like, includes a rasterizing processor 38 and a color separation condition setter 40.

The rasterizing processor 38 has the same rasterizing function as the DTP apparatus 16. The rasterizing processor 38 rasterizes input data depending on the type of input data. If device color signals are directly supplied to the first interface 30, then the rasterizing processor 38 does not need to rasterize the input data.

The color separation condition setter 40 sets a color separation condition SCfix for converting first color signals into second color signals. The color separation condition setter 40 includes an evaluating condition designator 42, a calculation area extractor 44, a color separation processor 46, an affecting level estimator 48, a used-amount-of-color-material estimator 50 (used amount estimator), and a color separation condition determiner 52.

As shown in FIGS. 2 and 3, the evaluating condition designator 42 designates a color separation condition for generally evaluating an image to be formed as a print 28. The evaluating condition designator 42 includes a standard color separation condition determiner 60 for determining a standard color separation condition (hereinafter referred to as a "standard color separation condition SCs"), and a color separation condition changer 62 (including a color separation condition generator 64 and an isochromaticity judging section 66, to be described later) for changing a color separation condition to be used for purposes of comparison (hereinafter referred to as a "comparative color separation condition SCc"). According to the present embodiment, the evaluating condition designator 42 evaluates an image based on a granularity that depends on the human visual response characteristics. The granularity may hereinafter be referred to simply as a "granularity a".

The calculation area extractor 44 extracts a calculation area 106 (see FIG. 5B), which will be estimated by the affecting level estimator 48, from an image area 100 represented by the first color signals. The calculation area extractor 44 includes a pixel-of-interest extractor 68 for extracting a pixel 102 of interest (see FIG. 5B) from a plurality of pixels contained within the image area 100, and a peripheral pixel extractor 70 for extracting at least one peripheral pixel 104 (see FIG. 5B) positioned on the periphery of the pixel 102 of interest that has been extracted by the pixel-of-interest extractor 68.

The color separation processor 46 color-separates first color signals, e.g., R, G, B color signals, into second color signals, e.g., C, M, Y, K color signals, based on one color separation condition (the standard color separation condition SCs or the comparative color separation condition SCc), which has been designated by the evaluating condition designator 42.

The affecting level estimator 48 estimates the affecting level of a visual effect (which may hereinafter be referred to simply as an "affecting level") on the pixel 102 of interest in the layout of the color of the pixel 102 of interest and colors of peripheral pixels 104 according to the first color signals (or the second color signals). The affecting level estimator 48 includes a simulation image generator 72 for generating a simulation image, which simulates color reproduction of the print 28 based on the first color signals corresponding to the calculation area 106 (see FIG. 5B) extracted by the calculation area extractor 44, the output characteristics of the image forming apparatus 14, to be described in detail later, and one color separation condition, and a granularity calculator 74 (including a colorimetric value converter 76, a physical quantity calculator 78, and a vision corrector 80, to be described later) for calculating a granularity σ based on the simulation image generated by the simulation image generator 72.

A granularity σ calculated under the standard color separation condition SCs may hereinafter be referred to as a "standard granularity σs", and a granularity σ calculated under the comparative color separation condition SCc may hereinafter be referred to as a "comparative granularity σc", for the purpose of distinguishing them from each other.

The used-amount-of-color-material estimator 50 estimates the total used amount of inks 22 in the pixel 102 of interest based on the second color signals supplied from the color separation processor 46.

The color separation condition determiner 52 determines a color separation condition SCfix for the pixel 102 of interest based on the total used amount of inks 22 estimated by the used-amount-of-color-material estimator 50, and the affecting level of a visual effect (standard granularity σ) estimated by the affecting level estimator 48. The color separation condition determiner 52 includes a matching condition setter 82 for setting a matching condition for the color separation condition SCfix, a suitability judging section 84 for judging whether or not the comparative color separation condition SCc is suitable according to the matching condition set by the matching condition setter 82, and an adjustment quantity determiner 86 for determining an adjustment quantity for the total used amount of inks 22, which are being used at the present time, depending on the judgment made by the suitability judging section 84.

The memory 32 stores a standard color separation table 54 corresponding to the standard color separation condition SCs, a plurality of target profiles 56 for defining colors corresponding to the first color signals, and a plurality of output profiles 58 for reproducing desired colors from the second color signals. The memory 32 may also store the first color signals and the second color signals along with various other items of information that are required by calculations for determining color separation conditions according to the present invention.

If it is possible to reproduce the color formed on the print 28 by the K ink 22$k$, which is an achromatic color material, by combining the C ink 22$c$, the M ink 22$m$, and the Y ink 22$y$, which are chromatic color materials, as is the case with the image forming apparatus 14 shown in FIG. 1, then a GCR (Gray-Component Replacement) color separation process and an IGCR (Inverse Gray-Component Replacement) color separation process are effective. Details of the GCR color separation process and the IGCR color separation process will be described later.

The image processing apparatus 12 according to the present embodiment basically is configured as described above. Operations of the image processing apparatus 12 shown in FIGS. 1 and 2 will be described below with reference to the flowchart shown in FIG. 4.

First, the image processing apparatus 12 receives first color signals that are input through the first interface 30 (step S1). Two signal input patterns are assumed.

According to the first signal input pattern, the DTP apparatus 16 rasterizes an electronic manuscript in PDL format, which the DTP apparatus 16 has generated through a predetermined editing process, thereby generating device color signals, e.g., R, G, B color signals. The image processing apparatus 12 receives the device color signals, which are supplied from the DTP apparatus 16 through the first interface 30.

According to the second signal input pattern, the DTP apparatus 16 generates an electronic manuscript in PDL format through a predetermined editing process, and supplies the electronic manuscript in PDL format to the image processing apparatus 12. Thereafter, the rasterizing processor 38 reads data stored in the memory 32, such as a target profile 56 and an output profile 58, and rasterizes the supplied electronic manuscript in PDL format, thereby generating device color signals, e.g., R, G, B color signals.

Next, the image processing apparatus 12 acquires output characteristics of the image forming apparatus 14 through the first interface 30 (step S2). The output characteristics of the image forming apparatus 14 refer to various characteristics concerning outputting of an image based on the first color signals. The output characteristics include not only physical properties, such as the type (colors, sizes, shapes, etc.) of dots to be formed and the output resolution, but also various items of information (the type of image forming apparatus, the type of medium, not shown, etc.) that are correlated with the physical properties. The image processing apparatus 12 may acquire the output characteristics directly from the image forming apparatus 14, or may acquire the output characteristics from the database server 18 in which the output characteristics have been registered and managed in advance.

Next, the evaluating condition designator 42 designates the standard color separation condition SCs as a color separation condition to be evaluated (step S3). For example, the standard color separation condition determiner 60 reads the standard color separation table 54 from the memory 32 (see FIG. 2), and determines the standard color separation table 54 as the standard color separation condition SCs.

Next, the pixel-of-interest extractor 68 extracts a pixel 102 of interest, which has not yet been extracted, from a plurality of pixels represented by the first color signals (step S4).

FIG. 5A is a diagram showing a visual image, which is represented by the first color signals. The image area 100 represents a natural picture of the upper half of the body of a woman, substantially at a center position thereof. FIG. 5B is a diagram showing the pixel 102 of interest, which is extracted by the pixel-of-interest extractor 68. The pixel 102 of interest corresponds to a rectangular area (one pixel) as a minimum unit, which is shown in hatching in the figure.

Next, the affecting level estimator 48 (the granularity calculator 74) estimates the granularity as of the image under the standard color separation condition SCs (step S5). A process of estimating the granularity as will be described in detail below with reference to the flowchart shown in FIG. 6.

First, the peripheral pixel extractor 70 extracts at least one peripheral pixel 104, which is positioned on the periphery of the pixel 102 of interest, from the image area 100 represented by the first color signals (step S51). In FIG. 5B, a rectangular area, which is three pixels wide horizontally and five pixels long vertically, is determined in advance as a calculation area 106 around the pixel 102 of interest. The peripheral pixel extractor 70 excludes the pixel 102 of interest, and extracts, as peripheral pixels 104, fourteen pixels out of the fifteen pixels that reside within the calculation area 106.

The peripheral pixel extractor 70 may extract a constant number of peripheral pixels 104, or may extract peripheral pixels 104 at a constant position. For example, the peripheral pixel extractor 70 may change the number of peripheral pixels 104, i.e., the total pixels that reside within the calculation area 106, depending on the output resolution of the image forming apparatus 14, or more specifically, so that the calculation area 106 will have a substantially constant output size.

Next, using the output characteristics of the image forming apparatus 14, the simulation image generator 72 generates a simulation image of the calculation area 106 (step S52). Prior to generation of the simulation image, the color separation processor 46 performs a color separation process on the first color signals, which correspond to the calculation area 106 under the standard color separation condition SCs, and supplies a portion of the produced second color signals to the affecting level estimator 48. The simulation image generator 72 simulates various processes, which actually are performed by the image forming apparatus 14, in order to reproduce pseudo-colors of the image of a print 28. The various processes include a resolution converting process, a halftoning process, a color plate superimposing process, a dot forming process, etc. The data definition of pseudo-images is determined in advance depending on an RMS calculation process (see step S54) to be described later. According to the present embodiment, the first color signals are converted into C, M, Y, K color signals (second color signals) under the standard color separation condition SCs, thereby generating a simulation image having the same resolution, e.g., 1200 dpi, as the output resolution of the image forming apparatus 14. For better image reproducibility, the resolution of the simulation image preferably is higher than the resolution of the first color signals, and more preferably, is higher than the resolution of the image forming apparatus 14.

Next, the colorimetric value converter 76 predicts colorimetric values of an output image with respect to each pixel in the calculation area 106, i.e., the pixel 102 of interest and at least one peripheral pixel 104, and converts the data definition of the simulation image (step S53). The colorimetric values may be represented not only by tristimulus values X, Y, Z or values L*, a*, b* in a uniform color space, but also by a distribution of optical properties in a range of wavelengths, e.g., a spectral radiation distribution (spectral distribution), a spectral sensitivity distribution, a spectral reflectance, or a spectral transmittance. Although the type of colorimetric values used is not important, according to the present embodiment, a certain printing density is employed.

The printing density of an image can be predicted from a relationship based on various mathematical models. In order to increase prediction accuracy, the mathematical models may be optimized using the output profiles 58, etc. Such mathematical models may be linear models or nonlinear models, may be related by a data structure of LUTs or the like, and may be based on the Monte Carlo method, a neural network, a boosting algorithm, a genetic algorithm, or the like, which is applied thereto. The predicting processes may be changed depending on different output characteristics of the image forming apparatus 14, e.g., types of inks 22 or types of mediums, not shown.

Figure 7C:
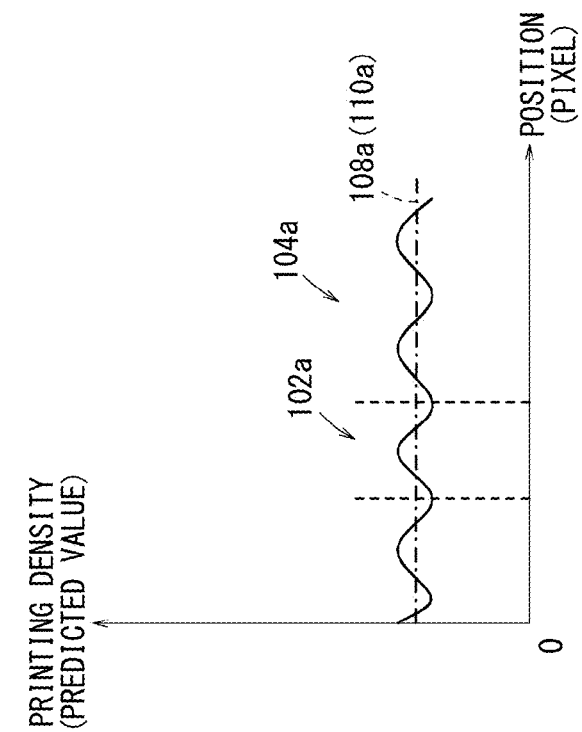
FIGS. 7A through 7C are diagrams illustrating a process of predicting a printing density of an image in a first calculation area that resides within an image area represented by first color signals.
Figure 7B:
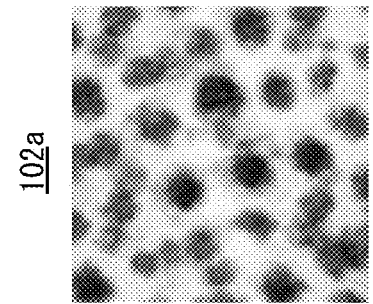
Figure 7A:
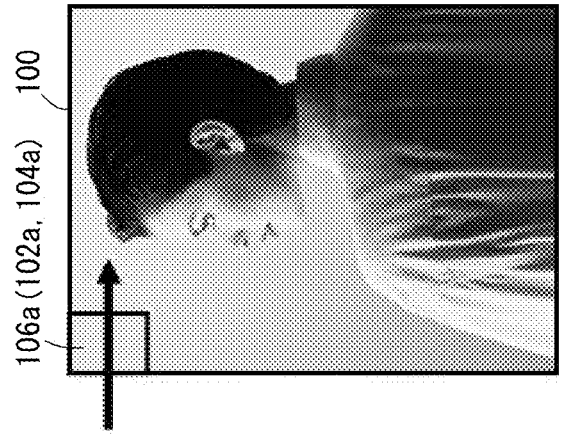

For example, as shown in FIG. 7A, it is assumed that the calculation area extractor 44 extracts a background area (first calculation area 106a) in the upper left corner of the image area 100. FIG. 7B is an enlarged front elevation view of a first pixel 102a of interest, which exists on the arrow in the first calculation area 106a shown in FIG. 7A. In this manner, a plurality of dots are formed having a plurality of colors, whereby the plural dots macroscopically reproduce a single color.

FIG. 7C illustrates a profile of the printing density along the arrow shown in FIG. 7A. The plotted data in FIG. 7C correspond to the position and printing density of the first pixel 102a of interest shown in FIG. 7B. The dot-and-dash line represents a smoothed curve 108a, which is plotted as a moving average of the actual profile (solid line) within a certain width. The smoothed curve 108a coincides substantially with an average value 110a of the printing density. The printing density of the first calculation area 106a is flat macroscopically, and varies microscopically in a substantially periodic fashion.

Figure 8C:
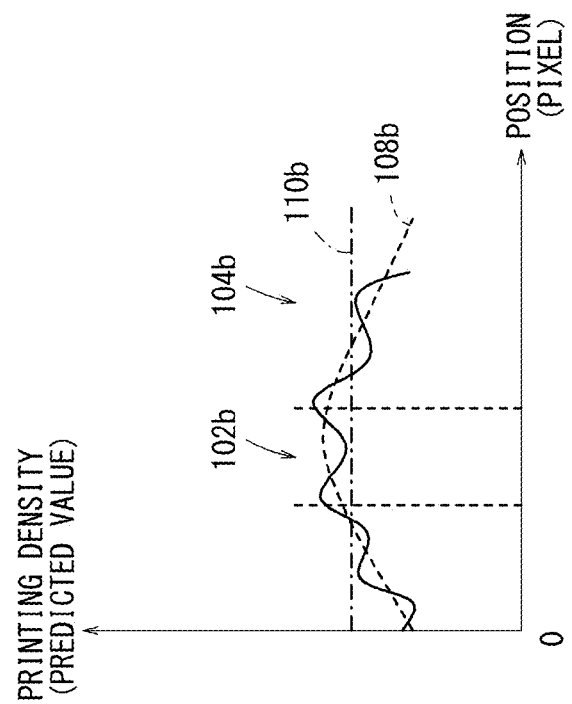
FIGS. 8A through 8C are diagrams illustrating a process of predicting a printing density of an image in a second calculation area that resides within the image area represented by the first color signals.
Figure 8B:
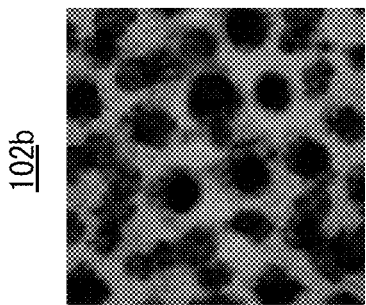
Figure 8A:
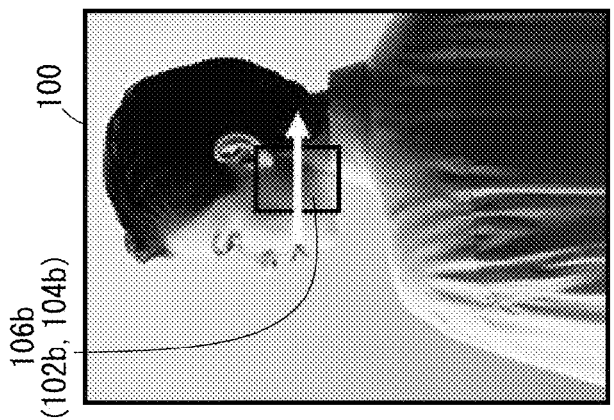

As shown in FIG. 8A, it is assumed that the calculation area extractor 44 extracts a facial area (second calculation area 106b) substantially in the center of the image area 100. FIG. 8B is an enlarged front elevation view of a second pixel 102b of interest, which exists on the arrow in the second calculation area 106b shown in FIG. 8A. FIG. 8C illustrates a profile of the printing density along the arrow shown in FIG. 8A.

The broken line in FIG. 8C represents a smoothed curve 108b, which is plotted as a moving average of the actual profile (solid line) within the same width as shown in FIG. 7C. The straight dot-and-dash line represents an average value 110b of the printing density. The printing density of the second calculation area 106b varies gradually and macroscopically along an upwardly convex curve, and varies microscopically with the same amplitude and period as the printing density of the first calculation area 106a shown in FIG. 7C.

The effect that the visual effect has on a human as an observer will be described below with reference to the examples shown in FIGS. 7A through 8C. Human vision tends to recognize an image by smoothing not only the central position thereof but also a peripheral area around the central position. For example, the printing density of each of the peripheral pixels 104a in the first calculation area 106a shown in FIG. 7A is substantially uniform as observed macroscopically. Therefore, if the microscopic granularity in the first pixel 102a of interest is relatively high in comparison with each of the peripheral pixels 104a, the observer tends to visually recognize the graininess of the first pixel 102a of interest at an outstanding level.

In the second calculation area 106b shown in FIG. 8A, the printing density of each of the peripheral pixels 104b varies macroscopically. Therefore, even if the microscopic granularity in the second pixel 102b of interest is relatively high in comparison with each of the peripheral pixels 104a, the observer does not visually perceive the graininess of the second pixel 102b of interest.

Referring back to FIG. 6, the physical quantity calculator 78 calculates an RMS (Root Mean Square), i.e., a standard deviation, of the printing density in the calculation area 106 (step S54). More specifically, the physical quantity calculator 78 calculates the RMS while excluding the average values 110a, 110b (see FIGS. 7C and 8C) in the calculation areas 106a, 106b. In other words, the calculated RMS is represented by a numerical value with the tendencies of the smoothed curves 108a, 108b (see FIGS. 7C and 8C) added thereto.

Next, the vision corrector 80 performs a vision correction on the RMS of the printing density, thereby acquiring a granularity $\sigma$ (step S55). The granularity $\sigma$ represents a psychophysical quantity, which is correlated to visibility of the image, and is substantially linear with respect to a feeling of granularity sensed by the observer (human). In the following description, the granular state improves as the value of the granularity $\sigma$ becomes smaller.

Figure 9:
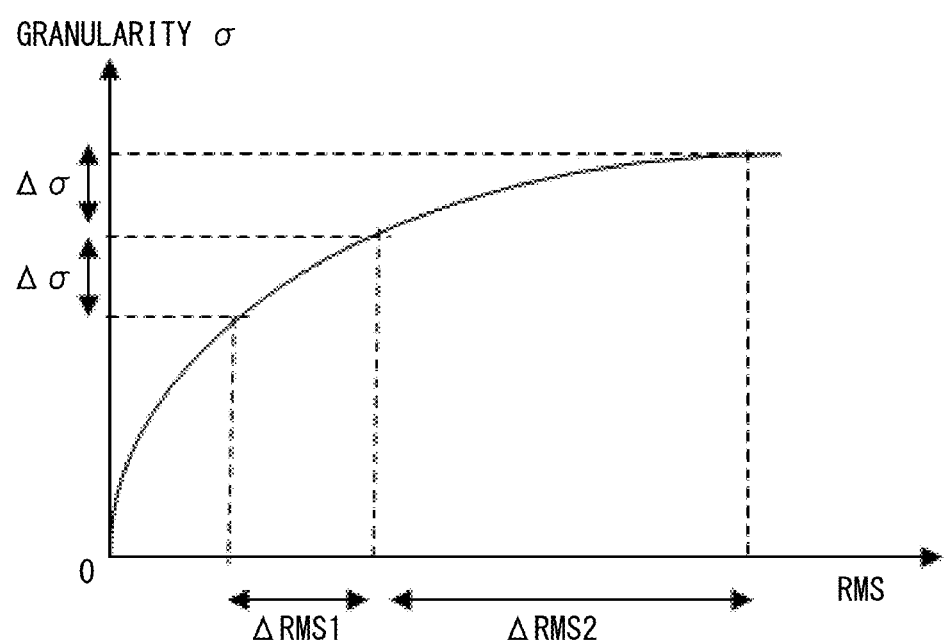
FIG. 9 is a graph showing by way of example a correlative relationship between an RMS value, which serves as a physical quantity, and granularity, which serves as a psychophysical quantity.

FIG. 9 is a graph showing by way of example a correlative relationship between the RMS as a physical quantity and the granularity $\sigma$ as a psychophysical quantity. According to the graph, the gradient of the curve is sharper in an area where the RMS value is smaller, and becomes gradually less in sharpness as the value of the RMS increases. For example, even if differences in observed granularities $\sigma$ of two images are the same ($\Delta\sigma$), the differences between the RMSs ($\Delta$RMS1, $\Delta$RMS2) that correspond to the differences in the observed granularities $\sigma$ differ from each other. In other words, correcting the RMS according to the conversion curve shown in FIG. 9 enables the RMS to be correlated appropriately with the granularity $\sigma$.

The conversion curve may be changed in various ways depending on the image attribute (a reflective image or a transmissive image), the light source type, the image observation distance, etc. Alternatively, the conversion curve may be changed depending on the type of physical quantity of the calculated RMS.

Figure 4:
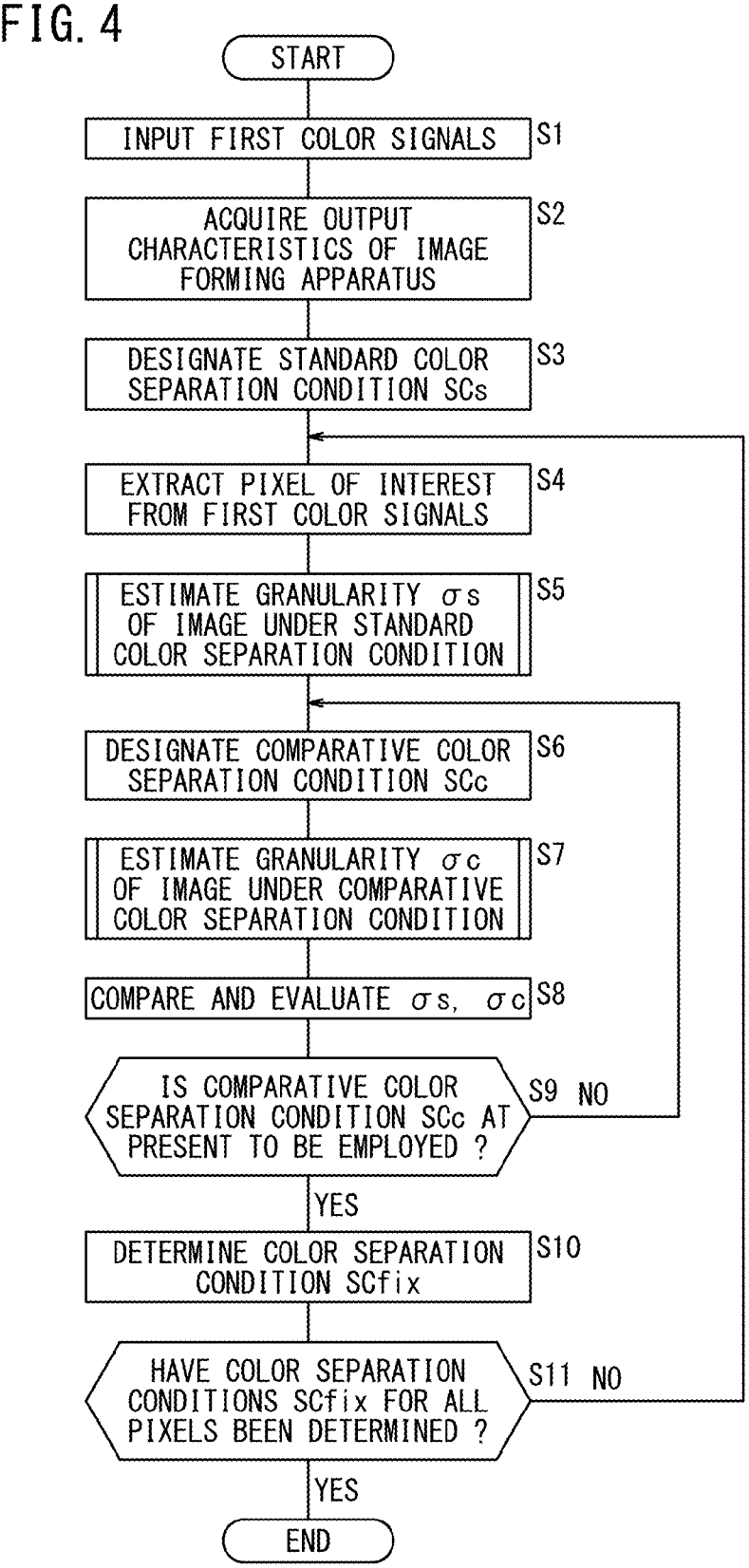
FIG. 4 is a flowchart of an operation sequence of the image processing apparatus shown in FIGS. 1 and 2.

In this manner, the affecting level estimator 48 (granularity calculator 74) estimates a standard granularity $\sigma$s under the standard color separation condition SCs (step S5 in FIG. 4).

Referring back to FIG. 4, the evaluating condition designator 42 designates a color separation condition, which differs from or is the same as the standard color separation condition SCs, i.e., the comparative color separation condition SCc (step S6).

The evaluating condition designator 42 sets the comparative color separation condition SCc according to a predetermined policy for changing color separation conditions. The policy for changing color separation conditions is a policy governed by whether importance should be attached to either image quality or cost (a reduction in the total used amount of inks 22). The evaluating condition designator 42 may determine the policy for changing color separation conditions depending on the value of the reference granularity $\sigma$s.

An outline of the GCR color separation process and the IGCR color separation process will be described below with reference to FIGS. 10A through 11C.

Figure 10A:
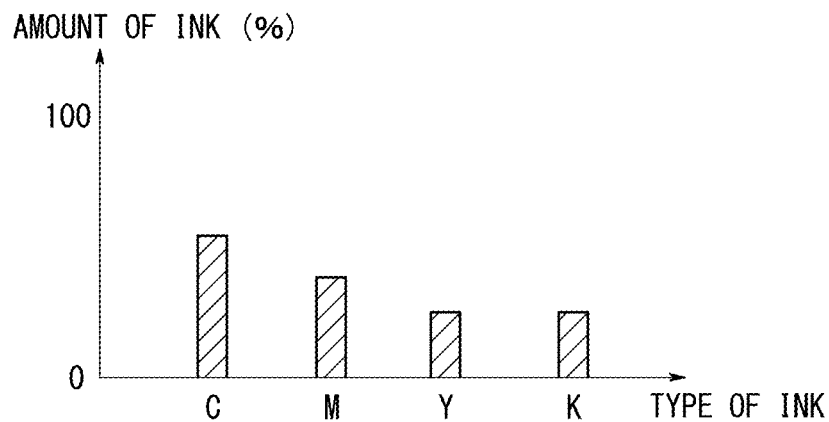
FIG. 10A is a graph showing a relationship between types of inks and used amounts of the inks before each color separation process.
Figure 10B:
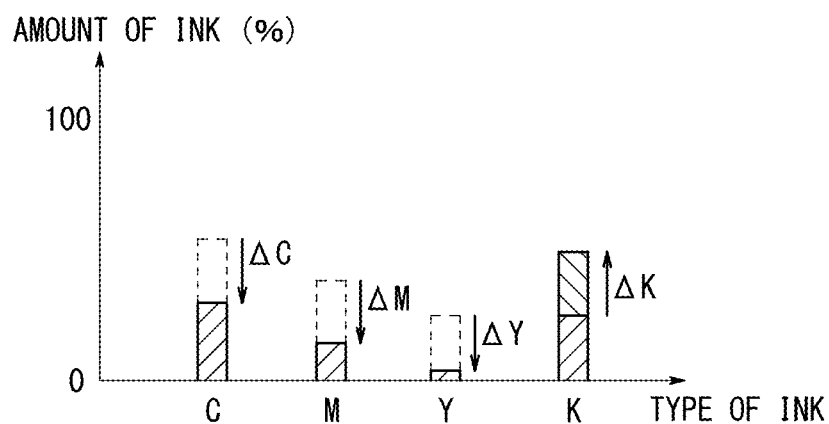
FIG. 10B is a graph showing a relationship between types of inks and used amounts of the inks after a GCR color separation process.
Figure 10C:
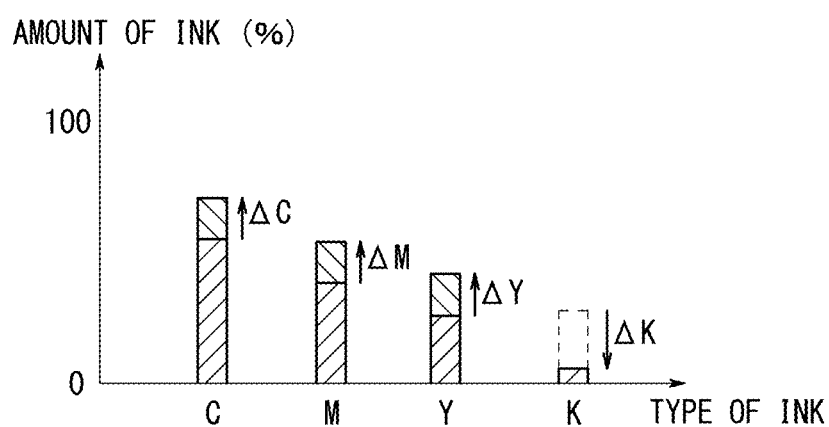
FIG. 10C is a graph showing the relationship between types of inks and used amounts of the inks after an IGCR color separation process.

FIG. 10A is a graph showing a relationship between the types of inks and used amounts of inks before the standard color separation process is performed. FIG. 10B is a graph showing a relationship between the types of inks and used amounts of inks after the GCR color separation process is performed. FIG. 10C is a graph showing a relationship between the types of inks and used amounts of inks after the IGCR color separation process is performed.

In FIG. 10B, the C ink 22c, the M ink 22m, and the Y ink 22y are reduced respectively by $\Delta$C, $\Delta$M, $\Delta$Y from the C ink 22c, the M ink 22m, and the Y ink 22y shown in FIG. 10A. In order to cancel out a reduction in density caused by the reduced amounts of inks 22, the K ink 22k is increased by $\Delta$K. In this manner, the total used amount of inks 22 is reduced by ($\Delta$C+$\Delta$M+$\Delta$Y-$\Delta$K) while color reproducibility of the print 28 (see FIG. 1) is maintained substantially constant.

In FIG. 10C, the C ink 22c, the M ink 22m, and the Y ink 22y are increased respectively by $\Delta$C, $\Delta$M, $\Delta$Y from the C ink 22c, the M ink 22m, and the Y ink 22y shown in FIG. 10A. In order to cancel out an increase in density caused by the increased amounts of inks 22, the K ink 22k is reduced by $\Delta$K. In this manner, the total used amount of inks 22 is increased by ($\Delta$C+$\Delta$M+$\Delta$Y-$\Delta$K) while color reproducibility of the print 28 (see FIG. 1) is maintained substantially constant. Since the coverage ratio of the formed dots becomes higher, granularity is suppressed as a whole.

Figure 11A:
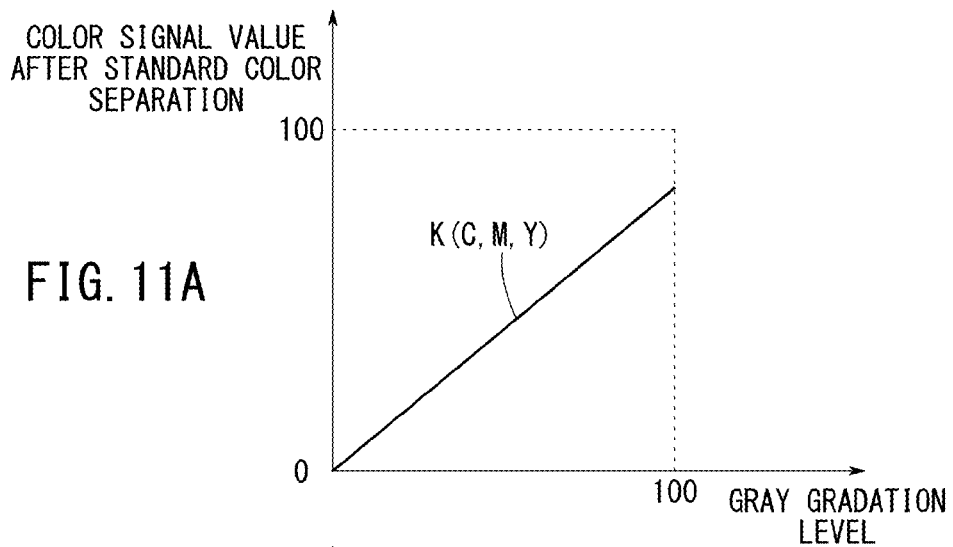
FIG. 11A is a graph showing the results of a color separation process using a standard color separation table for reproducing shades of gray.
Figure 11B:
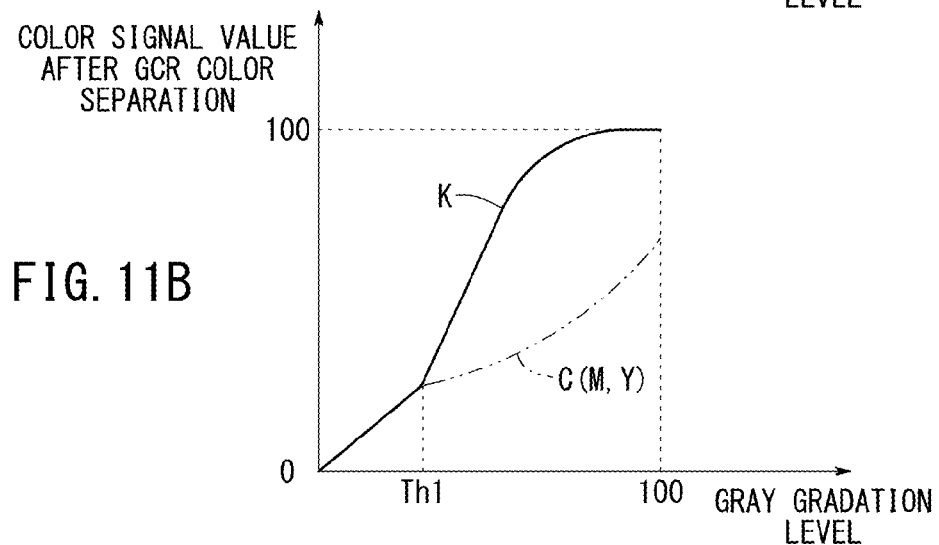
FIG. 11B is a graph showing the results of a color separation process using a GCR color separation table for reproducing shades of gray.
Figure 11C:
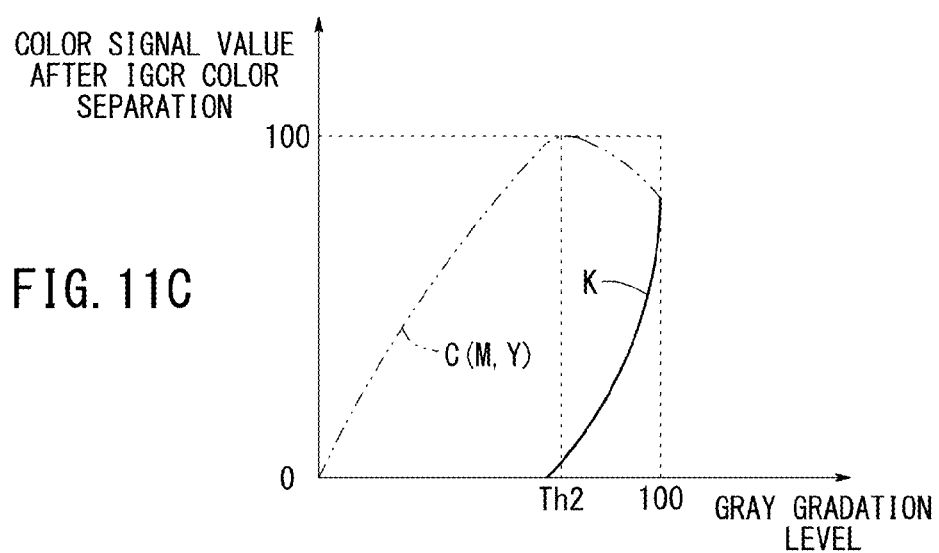
FIG. 11C is a graph showing the results of a color separation process using an IGCR color separation table for reproducing shades of gray.

Characteristics of the GCR color separation table used in the GCR color separation process and the IGCR color separation table used in the IGCR color separation process will be described below in comparison with the standard color separation table 54. FIGS. 11A through 11C are graphs showing the results of respective color separation processes using the color separation tables for reproducing shades of gray (R=G=B). Each of the graphs has a horizontal axis representing gray gradation levels (%), and a vertical axis representing color signal values (%) after the color separation processes have been performed.

The graph illustrated in FIG. 11A shows the results of a color separation process using the standard color separation table 54. The graph does not represent an equivalent transformation (Y=X), but rather, represents a linear curve the gradient of which is much smaller than 1. This is because the total used amount of inks 22 is limited to less than 400%. The respective used amounts of inks 22 are the same at each gradation level of gray.

The graph illustrated in FIG. 11B shows the results of a color separation process using the GCR color separation table. The K value represents an equivalent transformation (Y=X) in a range $0 \leq K \leq Th1$, and further represents a curve with a high gradient in a range $K \geq Th1$, which is saturated near 100% in a range of high color signal values. Another color (e.g., the C value) represents an equivalent transformation (Y=X) in a range $0 \leq C \leq Th1$, and further represents a curve with a low gradient in a range $K \geq Th1$, which monotonically increases up to a maximum range (100%). In a range beyond Th1, the ratio of K is greater than the ratios of the other colors (C, M, Y). As can be seen from FIG. 11B, the GCR color separation table is effective to reduce the total amount of inks 22 used in a range from Th1 to 100%.

The graph illustrated in FIG. 11C shows the results of the color separation process using the IGCR conversion table. The K value is 0% at all times in a range $0 \leq K \leq Th2$, and is non-zero and sharply increases in a range $K \geq Th2$. Another color (e.g., the C value), in a range 0≤C≤Th2, is an upwardly convex monotonically increasing function, which reaches a maximum value of 100% at C=Th2, and then gradually decreases in a range K≥Th2. Within the overall range, the ratio of K is smaller than the ratio of the other colors (C, M, Y). As can be understood from FIG. 11C, the IGCR color separation table is effective to increase the total amount of inks 22 used in the range from 0 to 100%.

Under the policy that the total used amount of inks 22 should be reduced as much as possible while any degradation (increase) in granularity σ is kept within an allowable range, the color separation condition generator 64 generates a new GCR color separation table. The evaluating condition designator 42 designates the GCR color separation table, which is generated by the color separation condition generator 64, as the comparative color separation condition SCc (step S6).

Next, the affecting level estimator 48 (the granularity calculator 74) estimates the granularity σ (comparative granularity σc) of the image under the comparative color separation condition SCc (step S7). The specific estimating process is similar to the estimating process in step S5, but differs therefrom in that the comparative color separation condition SCc is used instead of the standard color separation condition SCs.

Next, the suitability judging section 84 compares the standard granularity σs estimated in step S5 and the comparative granularity σc estimated in step S7 in order to evaluate the respective granularities with each other (step S8). For example, provided that the matching condition setter 82 has previously set a threshold value Th (positive value) in advance, the suitability judging section 84 judges that the comparative color separation condition SCc is applicable if a judging condition (−Th≤σc−σs≤Th) is satisfied. If the judging condition is not satisfied, the suitability judging section 84 judges that the comparative color separation condition SCc is not applicable.

The suitability judging section 84 judges whether or not the comparative color separation condition SCc is to be employed at the present time (step S9). More specifically, the suitability judging section 84 judges whether or not the comparative color separation condition SCc, which has been judged as applicable in step S8, should be employed, i.e., whether or not the comparative color separation condition SCc should actually be used in the color separation process for the first color signals.

If the suitability judging section 84 determines that the comparative color separation condition SCc should not be used, control returns to step S6. The evaluating condition designator 42 (the color separation condition changer 62) designates a new comparative color separation condition SCc, which differs from the previously designated comparative color separation condition SCc (step S6). Before the evaluating condition designator 42 designates a new comparative color separation condition SCc, the adjustment quantity determiner 86 determines an adjustment quantity, e.g., an incremental or decremental quantity, for the total amount of inks 22 used at the present time (under the latest comparative color separation condition SCc), depending on the judgment made by the suitability judging section 84. The color separation condition generator 64 generates a comparative color separation condition SCc based on the indication that the comparative color separation condition SCc at the present time should not be employed, and the adjustment quantity from the color separation condition determiner 52.

In order to sufficiently guarantee the color reproducing characteristics, the isochromaticity judging section 66 may be provided for judging whether or not a color reproduction equivalent to the standard color separation table 54 is possible according to the comparative color separation condition SCc (color separation table), which is generated sequentially. The isochromaticity judging section 66 determines in advance an isochromatic range (e.g., color difference Δe<0.5) in a device-independent color space such as an L*a*b* coordinate system or the like, for example, and judges whether or not colors fall within the predetermined isochromatic range in a total or partial gamut. Consequently, the color separation condition determiner 52 can determine a color separation condition SCfix such that the color of the pixel 102 of interest that is based on the first color signals coincides essentially with the color of the pixel 102 of interest that is based on the second color signals in the device-independent color space.

Designation and changing of the comparative color separation condition SCc (step S6), estimation of the comparative granularity σc (step S7), and judgment of whether or not the comparative color separation condition SCc is suitable (step S9) are repeated successively in order to determine an optimum color separation condition SCfix according to the matching condition set by the matching condition setter 82. The algorithm for seeking an optimum color separation condition is not limited to the above process, but may be any of various processes.

Next, the color separation condition determiner 52 determines the comparative color separation condition SCc, which is finally employed as the color separation condition SCfix (step S10). The controller 34 temporarily stores color separation condition information concerning the color separation condition SCfix in the memory 32, and supplies the color separation condition information, as necessary, to the site that carries out the color separation process, e.g., the image forming apparatus 14.

Thereafter, the color separation condition setter 40 confirms whether or not color separation conditions SCfix have been determined for all of the pixels in the image area 100 (step S11). If not yet determined, then control returns to step S4, whereupon steps S4 through S10 are repeated until color separation conditions SCfix have been determined for all of the pixels.

As described above, since the affecting level estimator 48 estimates the affecting level of a visual effect on the pixel 102 of interest in the layout of the color of the pixel 102 of interest, which is extracted, and the color of at least one of the peripheral pixels 104 surrounding the pixel 102 of interest, the characteristics of the image including the peripheral pixels 104 can be grasped on a macroscopic level. Furthermore, since the used-amount-of-color-material estimator 50 estimates the total amount of inks 22 used by the pixel 102 of interest, the characteristics of the image of the pixel 102 of interest can be grasped on a microscopic level. Stated otherwise, a color separation condition SCfix can be determined based on image characteristics both on a macroscopic level and a microscopic level, so that a print 28, the image of which has been optimized in each local area, can be produced.

Modifications of the color separation condition setter 40 according to the present embodiment will be described below with reference to FIGS. 12 through 17. Components thereof, which are identical to those of the present embodiment, are denoted by identical reference characters, and such features will not be described below.

[First Modification]

In the present embodiment, the affecting level of a visual effect is estimated in view of a single evaluation item (image granularity σ) (refer to the affecting level estimator 48 shown in FIG. 3). However, according to a first modification, as described below, other evaluation items apart from the image granularity σ may also be taken into account.

Figure 12:
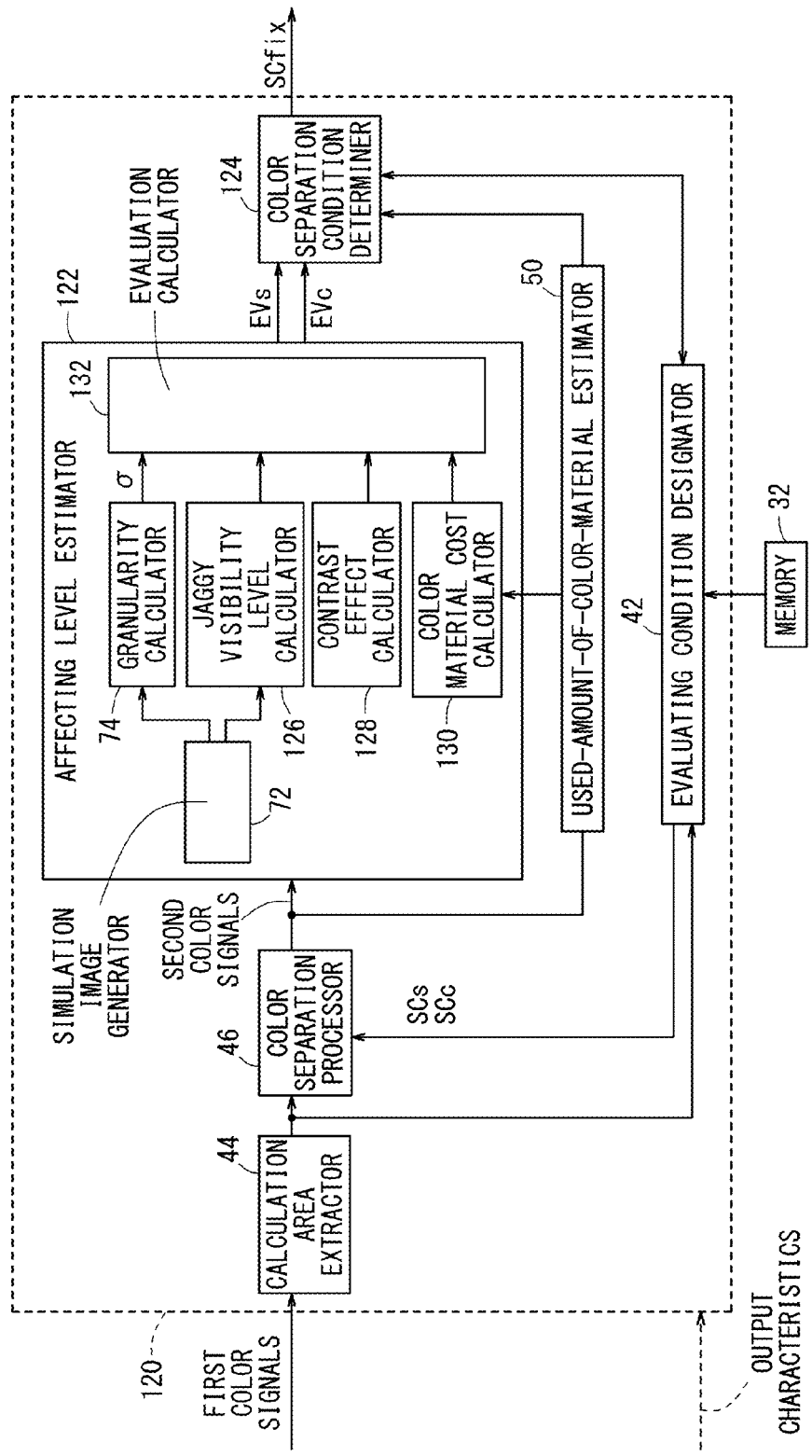
FIG. 12 is a detailed functional block diagram of a color separation condition setter according to a first modification.

As shown in FIG. 12, a color separation condition setter 120 according to the first modification includes, in addition to the evaluating condition designator 42, the calculation area extractor 44, the color separation processor 46, and the used-amount-of-color-material estimator 50, an affecting level estimator 122 for estimating the affecting level of a visual effect on the pixel 102 of interest as an overall evaluation value EV (including a standard overall evaluation value EVs and a comparative overall evaluation value EVc), and a color separation condition determiner 124 for determining a color separation condition based on the overall evaluation value EV estimated by the affecting level estimator 122.

The affecting level estimator 122 includes, in addition to the simulating image generator 72 and the granularity calculator 74, which have been described above, a jaggy visibility level calculator 126 for quantifying the visibility of jaggies (indicating the degree to which jaggies are generated) by extracting a certain object from the image, a contrast effect calculator 128 for quantifying the affecting level of various contrast effects including lightness, saturation, hue, and complementary color, etc., a color material cost calculator 130 for calculating the cost of inks 22 required to generate the print 28, and an evaluation calculator 132 for calculating the overall evaluation value EV based on the values calculated by the granularity calculator 74, etc.

Figure 13:
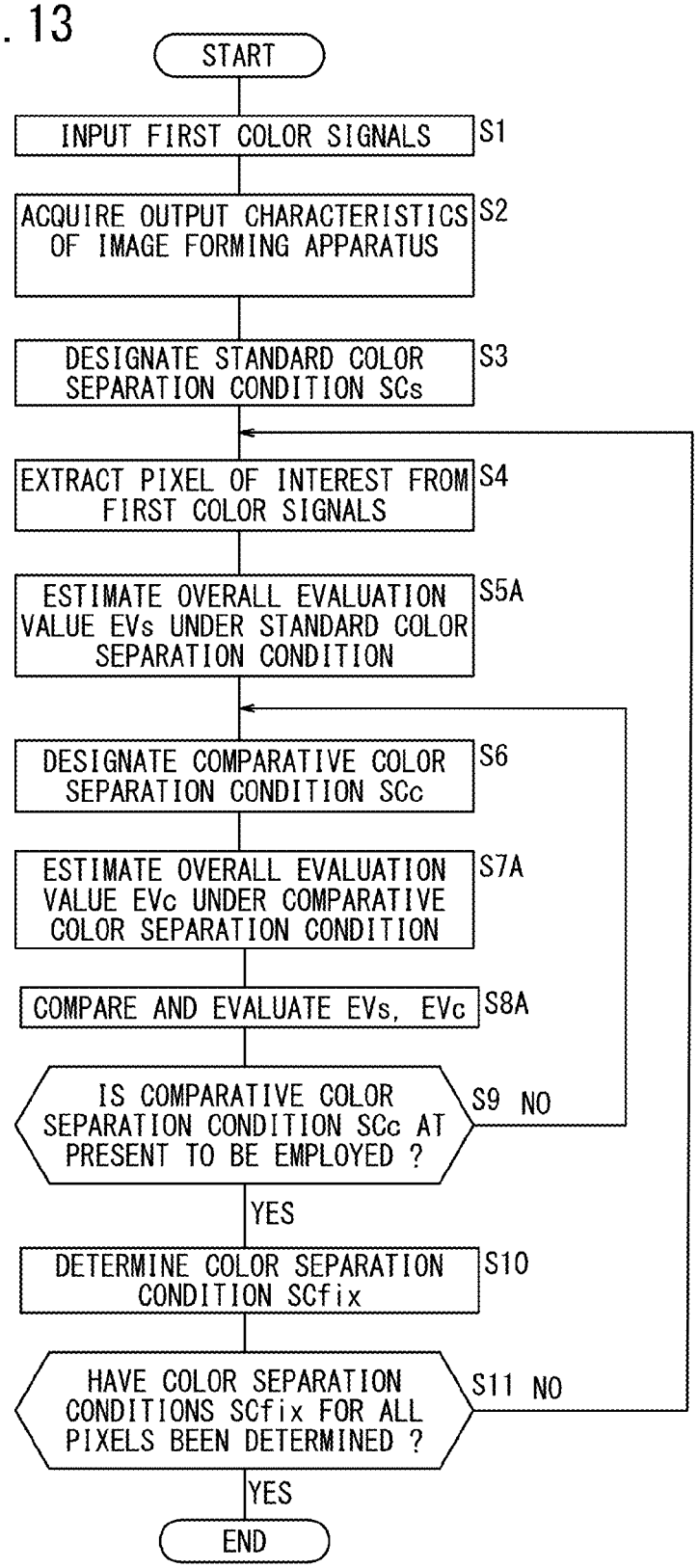
FIG. 13 is a flowchart of an operation sequence of an image processing apparatus according to the first modification.

FIG. 13 is a flowchart of an operation sequence of an image processing apparatus 12, which includes the color separation condition setter 120 according to the present modification. The flowchart shown in FIG. 13 is basically the same as the flowchart shown in FIG. 4, except for steps S5A, S7A (for calculating the overall evaluation value EV) and step S8A (for comparing and evaluating the overall evaluation value EV) thereof.

In step S5A, the affecting level estimator 122 not only calculates a granularity σs, but also quantifies various other items. For example, after the jaggy visibility level calculator 126 has extracted a particular object from the print 28, the jaggy visibility level calculator 126 estimates the visibility of jaggies in the object, and converts the estimated visibility into a first image evaluation value. The word "jaggies" refers to irregularities of an edge of the image along a tangential direction thereof. For quantification purposes, various indexes such as a ruggedness evaluation value may be applied.

The contrast effect calculator 128 compares the color of the pixel 102 of interest with the colors of the peripheral pixels 104, and judges whether or not the various contrast effects, including lightness, saturation, hue, and complementary color, etc., can be generated. If the contrast effect calculator 128 determines that the various contrast effects can be generated, then the contrast effect calculator 128 gives a reduced evaluation value (second image evaluation value) in view of the fact that the various contrast effects tend to cause visually adverse effects. The color material cost calculator 130 estimates the cost required to produce the print 28 based on the total used amount of inks acquired from the used-amount-of-color-material estimator 50, and then converts the estimated cost into a third image evaluation value.

Thereafter, the evaluation calculator 132 calculates an overall evaluation value EV under the standard color separation condition SCs, based on the granularity σs obtained by the granularity calculator 74, the first image evaluation value obtained by the jaggy visibility level calculator 126, the second image evaluation value obtained by the contrast effect calculator 128, and the third image evaluation value obtained by the color material cost calculator 130 (step S5A).

In step S7A, the evaluation calculator 132 calculates the overall evaluation value EV under the comparative color separation condition SCc, similar to the process performed in step S5A.

In step S8A, in order to evaluate the respective evaluation values, the color separation condition determiner 124 compares the standard overall evaluation value EVs calculated in step S5A with the comparative overall evaluation value EVc calculated in step S7A. Thereafter, the color separation condition determiner 124 (the suitability judging section 84 in FIG. 3) judges whether or not the comparative color separation condition SCc should be employed at the present time (step S9A).

The affecting level estimator 122 may take into account not only granularity, visibility of jaggies, contrast effects, and the cost of inks 22 as described above, but other evaluation items may also be taken into account. The evaluation calculator 132 may calculate the overall evaluation value EV according to various calculating methods.

As described above, since the color separation condition setter 120 sets the color separation condition SCfix based on a plurality of evaluation values, including at least the granularity σ, depending on the supplied color signals, it is possible to produce a print 28 that satisfies a plurality of evaluation items (quality, grade, etc.) including at least granularity.

[Second Modification]

In the present embodiment, a color separation condition SCfix is determined for each pixel 102 of interest (single pixel). However, according to a second modification to be described below, a color separation condition SCfix may be determined for respective blocks, each of which is made up of a plurality of pixels.

FIG. 14A is a diagram showing a visual image, which is represented by first color signals. The diagram is the same as that shown in FIG. 5A. FIG. 14B is a diagram showing an image area 100 divided into blocks. More specifically, the image area 100 is divided into thirty-six divided areas 140 of the same size. The calculation area extractor 44 may divide the image area 100 into any desired number of areas having a desired size.

As shown in FIG. 14C, one block has a size containing twenty pixels, which is five pixels long vertically and four pixels wide horizontally. If the pixel in the upper left corner is regarded as a pixel 142 of interest, then the remaining pixels (nineteen pixels) are regarded as peripheral pixels 144.

The granularity calculator 74 generates a granularity map representing a two-dimensional distribution of granularities σ, each of which is estimated for one divided area 140. A granularity map calculated under the standard color separation condition SCs will hereinafter be referred to as a standard granularity map GMs (standard granularity).

Figure 15A:
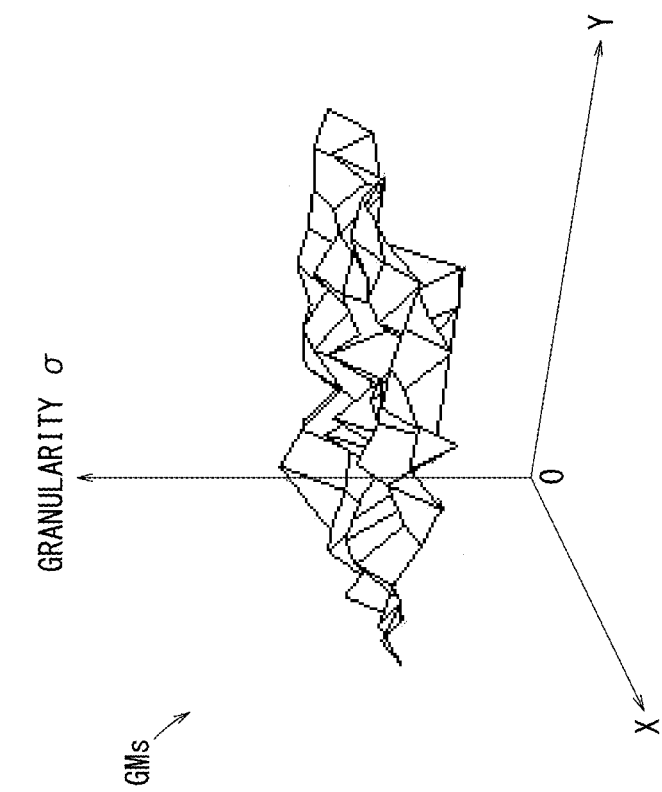
FIG. 15A is a graph showing a granularity map of first color signals under a standard color separation condition.

FIG. 15A is a graph showing a granularity map of an image under the standard color separation condition SCs.

Figure 15B:
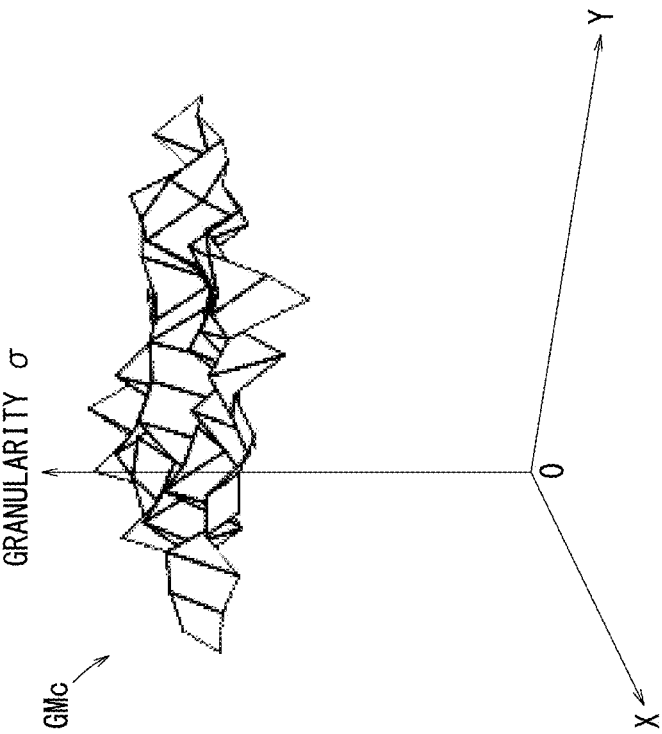
FIG. 15B is a graph showing a granularity map of first color signals under a comparative color separation condition.

The graph has an X-axis and a Y-axis, which represent positions of the divided areas 140. The standard granularity map GMs corresponds to standard values of the granularities σ depending on the positions of the divided areas 140. FIG. 15B is a graph showing a granularity map (comparative granularity map GMc) of an image under the comparative color separation condition SCc. From a comparison of FIGS. 15A and 15B, it will be understood that the granularities σ are large over the entire image area 100.

The suitability judging section 84 (see FIG. 3) judges whether or not the comparative granularity map GMc falls within an allowable range. The suitability judging section 84 may judge whether or not the comparative granularity map GMc falls within an allowable range with respect to all the divided areas 140, or with respect to only some of the divided areas 140.

Since the suitability of color separation conditions is judged using the granularity map (the standard granularity map GMs, the comparative granularity map GMc), the color separation condition SCfix can be determined while taking into account the overall balance of the image.

[Third Modification]

In the present embodiment, supplied device-dependent data (R, G, B color signals) are color-separated into device-dependent data (C, M, Y, K color signals) of a different type. However, according to a third modification, as described below, the color separation process may be carried out in series with another color converting process. A color separation condition setter 152 according to the present modification will be described below with reference to FIGS. 16 and 17.

Figure 16:
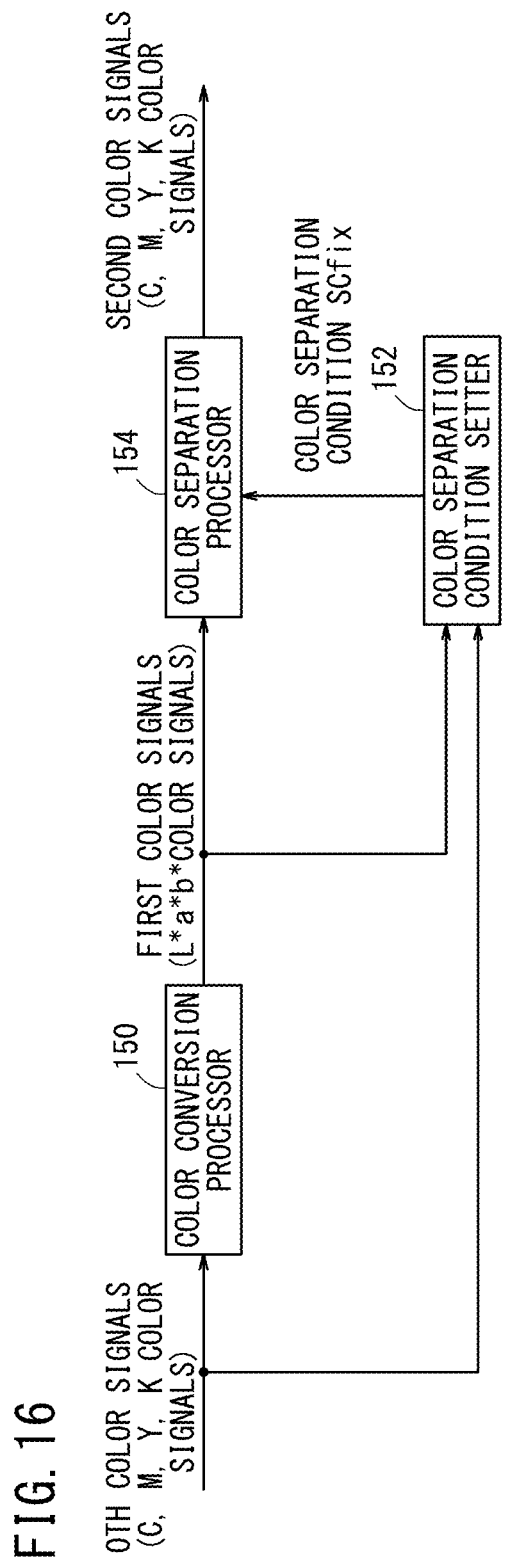
FIG. 16 is a block diagram illustrating a color separation process according to a third modification.

As shown in FIG. 16, the controller 34 (see FIG. 2) includes a color conversion processor 150 for converting 0th color signals, e.g., C, M, Y, K color signals, into first color signals, e.g., L*, a*, b* color signals, the color separation condition setter 152 for setting a color separation condition SCfix based on the 0th color signals and the first color signals, and a color separation processor 154 for color-separating the first color signals, which are generated by the color conversion processor 150, into second color signals, e.g., C, M, Y, K color signals, using the color separation condition SCfix set by the color separation condition setter 152.

Figure 17:
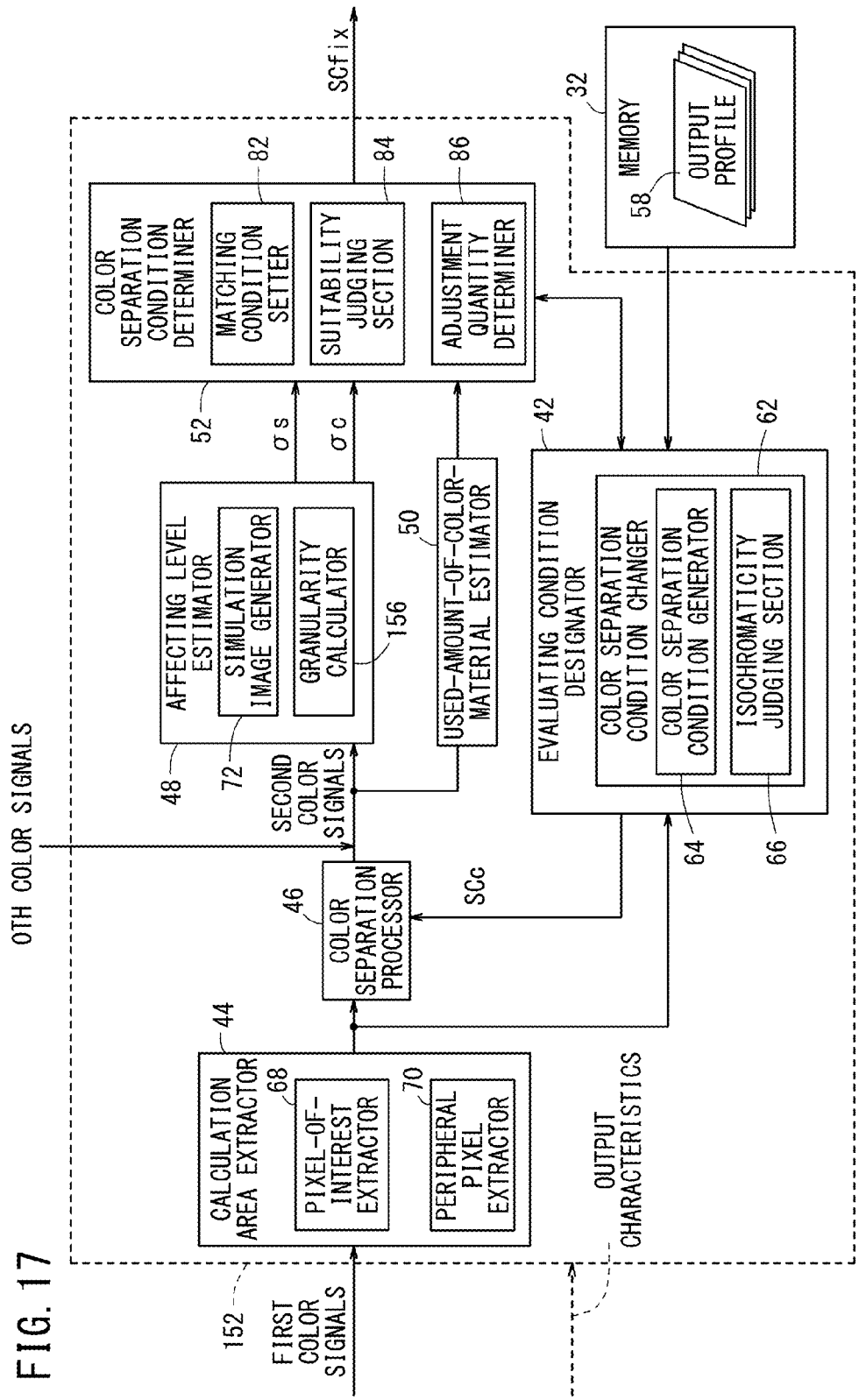
FIG. 17 is a detailed functional block diagram of a color separation condition setter shown in FIG. 16.

As shown in FIG. 17, in comparison with the color separation condition setter 40 (see FIG. 3), the color separation condition setter 152 does not have any components for determining and evaluating the standard color separation condition SCs. More specifically, the color separation condition setter 152 does not require the standard color separation table 54, the target profiles 56, and the standard color separation condition determiner 60. Instead, as a result of being directly supplied with the 0th color signals, the affecting level estimator 48 (or the used-amount-of-color-material estimator 50) calculates the standard granularity σs (or estimates the total used amount of inks 22). The standard color separation condition SCs is a condition for equalizing the second color signals to the 0th color signals, i.e., a color separation condition corresponding to a non-conversion process.

Figure 6:
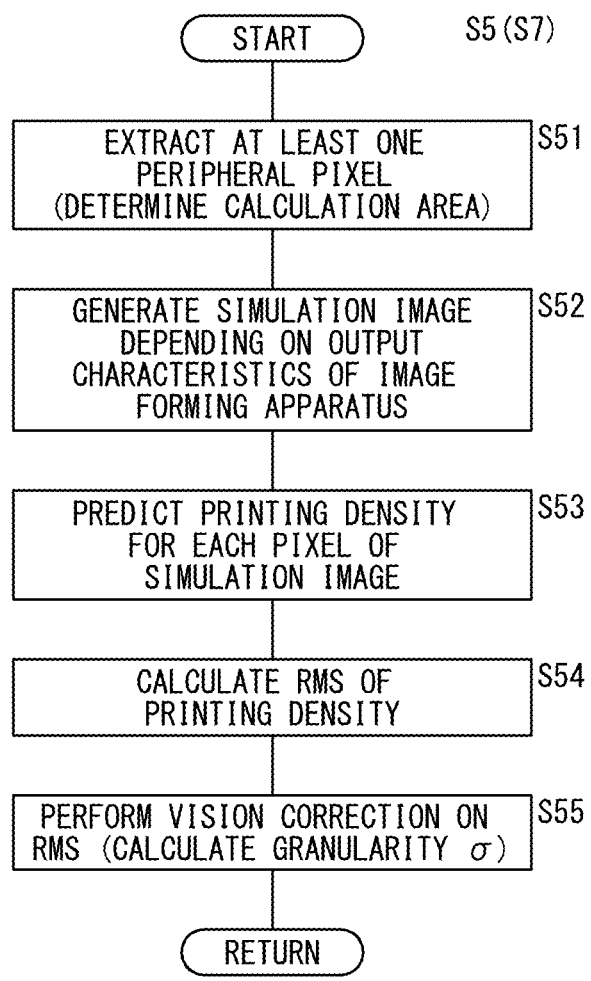
FIG. 6 is a detailed flowchart of steps S5 and S7 of FIG. 4.

A granularity calculator 156 may calculate the granularity σ according to a known evaluation process, rather than using the evaluation process according to the present embodiment (see steps S53 through S55 in FIG. 6). For example, the granularity σ may be of a value calculated by multiplying a noise Wiener spectrum with respect to lightness, chromaticity, etc., by a spatial frequency characteristic related to vision, e.g., a Dooley-Shaw VTF function, and then integrating the product. By correcting the value depending on average lightness, the correlation to a subjective evaluation is further increased.

The present invention is not limited to the embodiment described above, and the embodiment may be changed freely, insofar as such changes fall within the scope of the present invention.

For example, although a plurality of color separation tables, which are stored in the memory, are selected according to the present embodiment, various other processes may be applied. For example, the evaluating condition designator 42 may generate (or correct) a color separation table each time that a color separation condition is set.

The device color signals are not limited to colors of C, M, Y, K (four color plates). Rather, the device color signals may be changed into any desired types of color plates and a desired number of color plates. For example, standard inks in colors of C, M, Y, K may be combined with optional inks in pale colors such as LC, LM, or the like and W (white).

The image forming apparatus 14 is not limited to an inkjet printer, but may be any type of printer capable of producing dots by applying color materials to a print medium.

The present invention is not limited to the embodiments described above, but various changes and modifications may be made thereto without departing from the scope of the invention.

The invention claimed is:

1. A color separation condition determining apparatus which, in order to produce an output image by an image forming apparatus using n color materials wherein n is an integer of 2 or greater, determines a color separation condition to convert first color signals representing a plurality of pixels in m color channels wherein m is an integer of 1 or greater, into second color signals representing a plurality of pixels in n color channels that are correlated respectively with used amounts of the color materials, the color separation condition determining apparatus comprising:
   a pixel-of-interest extractor for extracting a pixel of interest from the plurality of pixels with respect to the first color signals input into the color separation condition determining apparatus from outside;
   a peripheral pixel extractor for extracting at least one peripheral pixel positioned on the periphery of the pixel of interest with respect to the first color signals;
   an affecting level estimator for estimating affecting level of a visual effect on the pixel of interest in a layout of a color of the pixel of interest, which is extracted by the pixel-of-interest extractor, and a color of the peripheral pixel which is extracted by the peripheral pixel extractor;
   a used-amount-of-color-material estimator for estimating a total used amount of the n color materials in the pixel of interest;
   a color separation condition determiner for determining the color separation condition for the pixel of interest based on the affecting level of the visual effect, which is estimated by the affecting level estimator, and the total used amount of the n color materials, which is estimated by the used-amount-of-color-material estimator;
   wherein the affecting level estimator
      estimates, under a standard color separation condition which is a color separation condition to be evaluated, a standard affecting level which is the affecting level of the visual effect, using a granularity, which is dependent on human visual response characteristics and wherein the affecting level estimator comprises:
a simulation image generator for generating a simulation image, which simulates the color reproduction of the output image based on output characteristics of the image forming apparatus; and
a granularity calculator for calculating the granularity based on the simulation image generated by the simulation image generator,
wherein the color separation condition determiner includes a suitability judging section for judging whether or not the comparative color separation condition is suitable, by comparing the standard affecting level and the comparative affecting level, which are estimated by the affecting level estimator based on output characteristics of the image forming apparatus and the first color signals.

2. The color separation condition determining apparatus according to claim 1, wherein the affecting level of the visual effect includes at least one of a spatial frequency response characteristic, a color resolution, a lightness contrast effect, a saturation contrast effect, a hue contrast effect, and a complementary color contrast effect in human vision.

3. The color separation condition determining apparatus according to claim 1, wherein the color separation condition determiner determines the color separation condition such that the color of the pixel of interest based on the first color signals coincides substantially with the color of the pixel of interest based on the second color signals in a device-independent color space.

4. The color separation condition determining apparatus according to claim 1, wherein the affecting level estimator estimates the affecting level of the visual effect using a different number of the peripheral pixels, the different number depending on output resolution of the image forming apparatus.

5. The color separation condition determining apparatus according to claim 1, further comprising a color separation condition changer for changing the comparative color separation condition, which is supplied to the affecting level estimator, depending on a judgment made by the suitability judging section.

6. The color separation condition determining apparatus according to claim 5, wherein the color separation condition determiner further includes a matching condition setter for setting a matching condition for the color separation condition; and
wherein changing of the comparative color separation condition by the color separation condition changer, estimating of the affecting level of the visual effect by the affecting level estimator, and judging of whether or not the comparative color separation condition is suitable by the suitability judging section are successively repeated in order to determine the color separation condition according to the matching condition set by the matching condition setter.

7. The color separation condition determining apparatus according to claim 1, wherein the simulation image generator generates the simulation image at a resolution that is higher than a resolution of the first color signals.

8. The color separation condition determining apparatus according to claim 1, wherein the granularity calculator predicts colorimetric values of the output image for each pixel of the simulation image, and estimates the granularity based on the colorimetric values.

9. The color separation condition determining apparatus according to claim 1, wherein the affecting level estimator estimates the affecting level of the visual effect using at least one image evaluation value with respect to the output image and the granularity.

10. The color separation condition determining apparatus according to claim 9, wherein the at least one image evaluation value includes the total used amount of the n color materials.

11. The color separation condition determining apparatus according to claim 9, wherein the at least one image evaluation value includes an evaluation value representing a quantified visibility of jaggies.

12. A color separation condition determining method which, in order to produce an output image by an image forming apparatus using n color materials wherein n is an integer of 2 or greater, determines a color separation condition to convert first color signals representing a plurality of pixels in m color channels wherein m is an integer of 1 or greater, into second color signals representing a plurality of pixels in n color channels that are correlated respectively with used amounts of the color materials, the color separation condition determining method comprising the steps of:
extracting a pixel of interest from the plurality of pixels with respect to the first color signals input from outside;
extracting at least one peripheral pixel positioned on the periphery of the pixel of interest with respect to the first color signals;
estimating affecting level of a visual effect on the pixel of interest in a layout of a color of the pixel of interest, which is extracted, and a color of the peripheral pixel which is extracted;
estimating a total used amount of the n color materials in the pixel of interest;
determining the color separation condition for the pixel of interest based on the affecting level of the visual effect, which is estimated, and the total used amount of the n color materials, which is estimated;
wherein
a standard affecting level which is the affecting level of the visual effect is estimated under a standard color separation condition, using a granularity, which is dependent on human visual response characteristics, the standard color separation condition being a color separation condition to be evaluated and
a comparative affecting level which is the affecting level of the visual effect is estimated, using the granularity, under a comparative color separation condition which is a color separation condition to be used for a purpose of comparison; and
wherein the step of estimating affecting level further comprises:
generating a simulation image, which simulates the color reproduction of the output image based on output characteristics of the image forming apparatus; and
calculating the granularity based on the simulation image generated by the step of generating a simulation image,
wherein the step of determining the color separation condition judges whether or not the comparative color separation condition is suitable, by comparing the standard affecting level and the comparative affecting level, which are estimated in the step of estimating affecting level based on output characteristics of the image forming apparatus and the first color signals.

13. A non-transitory storage medium readable by a computer that stores a program which, in order to produce an output image by an image forming apparatus using n color materials wherein n is an integer of 2 or greater, determines a color separation condition to convert first color signals representing a plurality of pixels in m color channels wherein m is an integer of 1 or greater, into second color signals representing a plurality of pixels in n color channels that are correlated respectively with used amounts of the color materials, the program enabling the computer to function as:

a pixel-of-interest extractor for extracting a pixel of interest from the plurality of pixels with respect to the first color signals input into the computer from outside;

a peripheral pixel extractor for extracting at least one peripheral pixel positioned on the periphery of the pixel of interest with respect to the first color signals;

an affecting level estimator for estimating affecting level of a visual effect on the pixel of interest in a layout of a color of the pixel of interest, which is extracted by the pixel-of-interest extractor, and a color of the peripheral pixel which is extracted by the peripheral pixel extractor;

a used-amount-of-color-material estimator for estimating a total used amount of the n color materials in the pixel of interest;

a color separation condition determiner for determining the color separation condition for the pixel of interest based on the affecting level of the visual effect, which is estimated by the affecting level estimator, and the total used amount of the n color materials, which is estimated by the used-amount-of-color-material estimator;

wherein the affecting level estimator
estimates, under a standard color separation condition which is a color separation condition to be evaluated, a standard affecting level which is the affecting level of the visual effect, using a granularity, which is dependent on human visual response characteristics, and wherein the affecting level estimator comprises:

a simulation image generator for generating a simulation image, which simulates the color reproduction of the output image based on output characteristics of the image forming apparatus; and a granularity calculator for calculating the granularity based on the simulation image generated by the simulation image generator, wherein the color separation condition determiner includes a suitability judging section for judging whether or not the comparative color separation condition is suitable, by comparing the standard affecting level and the comparative affecting level, which are estimated by the affecting level estimator based on output characteristics of the image forming apparatus and the first color signals.

* * * * *